United States Patent
Hauenstein et al.

(10) Patent No.: US 7,876,688 B2
(45) Date of Patent: Jan. 25, 2011

(54) TRAFFIC PROTECTION IN A COMMUNICATION NETWORK

(75) Inventors: Markus Hauenstein, Dusseldorf (DE); Jouko Kapanen, Helsinki (FI); Gerald Berghoff, Dusseldorf (DE)

(73) Assignee: Nokia Corporation (FI)

( * ) Notice: Subject to any disclaimer, the term of this patent is extended or adjusted under 35 U.S.C. 154(b) by 942 days.

(21) Appl. No.: 11/730,329

(22) Filed: Mar. 30, 2007

(65) Prior Publication Data
US 2008/0239943 A1    Oct. 2, 2008

(51) Int. Cl.
*G01R 31/08*  (2006.01)
*H04L 12/28* (2006.01)
*H04L 12/43* (2006.01)

(52) U.S. Cl. ............ 370/237; 370/254; 370/351; 370/404; 370/460

(58) Field of Classification Search .............. None
See application file for complete search history.

(56) References Cited

U.S. PATENT DOCUMENTS

| | | | |
|---|---|---|---|
| 7,027,451 B1 | | 4/2006 | Chiang |
| 7,602,726 B1 * | | 10/2009 | Sundaresan et al. ......... 370/237 |
| 2002/0176371 A1 * | | 11/2002 | Behzadi ..................... 370/254 |
| 2005/0201409 A1 * | | 9/2005 | Griswold et al. ............ 370/445 |
| 2005/0220062 A1 | | 10/2005 | Kido |
| 2006/0109802 A1 * | | 5/2006 | Zelig et al. .................. 370/258 |
| 2007/0297388 A1 * | | 12/2007 | Appaji et al. ............... 370/351 |
| 2008/0279183 A1 * | | 11/2008 | Wiley et al. ................ 370/389 |

FOREIGN PATENT DOCUMENTS

EP    1 672 847 A1    6/2006

OTHER PUBLICATIONS

Shah, S. and Yip, M., "Ethernet Automatic Protection Switching (EAPS)" version 1, Extreme Networks, Oct. 2003, pp. 1-7.
International Search Report PCT/EP2008/052925 filed Mar. 12, 2008.

* cited by examiner

*Primary Examiner*—Aung S Moe
*Assistant Examiner*—Jutai Kao
(74) *Attorney, Agent, or Firm*—Alston & Bird LLP

(57) ABSTRACT

A loop protection mechanism including dynamically determining a link connecting two adjacent nodes of a loop in a communication network in accordance with a predefined criterion, and reconfiguring the loop so that the loop is broken at the determined link which is an optimal link in terms of the predefined criterion. The breaking of the loop enables for example to utilize loop-free technologies (e.g. Ethernet) in a physical loop architecture.

31 Claims, 18 Drawing Sheets

TRAFFIC PROTECTION IN A COMMUNICATION NETWORK

FIELD OF THE INVENTION

The present invention relates to traffic protection in communication networks of any kind of architecture, topology and/or application area.

BACKGROUND OF THE INVENTION

In a communication network traffic protection can be implemented in many different ways for various network topologies (e.g. chain, star, loop and mesh topology, while a mesh consists of at least two loops). Especially loop-based networks are attractive for network operators, because they offer the capability of quite easily and cost efficiently enabling redundancy in a network consisting of a relatively large number of nodes. In loop-based networks a redundant path for each node is provided by just one additional link that closes two adjacent branches to form a loop. For example, loop protection, i.e. provision of redundancy by way of a loop structure, is used today by many mobile network operators e.g. for 2G and 3G radio access networks (RAN), where network elements like e.g. base stations (BTS), NodeB's or stand alone transmission equipment represent the nodes in the loop.

In a radio access network typically point to point micro wave radio (MWR) links are used to interconnect the nodes. MWR links are sensitive against bad weather conditions (e.g. heavy rain), which may easily degrade the MWR link quality. In order to maintain the MWR link at an acceptable quality level, the modulation (and though the capacity) is reduced when the link quality degrades. This usually leads to a link break and requires the switching of the traffic (or part of the traffic) to an alternative route to avoid service degradation or to minimise an unfavourable effect to the service. Therefore redundancy is especially important in networks (e.g. radio access networks) where MWR links are used.

However, although micro wave radio links are taken herein as one example for radio links, the above also applies more or less to any kind of wireless link irrespective of the underlying technology.

Currently, protected traffic in a loop in a communication network, including for example an MWR-based RAN, is based on time division multiplexing (TDM) technologies. Examples thereof include synchronous digital hierarchy (SDH) and plesiochronous digital hierarchy (PDH). In this case, SDH or PDH frames are encapsulated and sent across a link. With TDM transport technologies, typically 50% of the available capacity is reserved for redundancy. Capacity allocations (e.g. including bandwidth on links) are fixed, which means there is no capacity or bandwidth flexibility. The capability of adaptive radio modulation to maintain data transfer in bad transmission conditions can not be exploited. Therefore, decreasing capacity on a link would lead to a complete loss of certain links. Such a behaviour is known as on/off characteristic.

The above-mentioned drawbacks in current loop-based (radio) networks could be obviated by the use of a packet-based transport technology such as for example Ethernet (IEEE 802.3). Due to its bandwidth flexibility, Ethernet is particularly suitable as a data link layer technology over an MWR link with variable capacity or bandwidth, like it is the case with adaptive modulation. When the link capacity or bandwidth of a MWR link changes, Ethernet connectivity is not lost, but is flexible to adapt to the new link conditions. That is, Ethernet transport does not exhibit an on/off characteristic. Therefore, although Ethernet is only one non-limiting example for a packet-based transport technology usable in this regard, the following mainly refers to Ethernet when some kind of such a packet-based and/or asynchronous transport technology is meant.

Packet-based transport e.g. using Ethernet will become especially important when high speed traffic is carried over Ethernet. As data traffic has a strong statistical nature, the capacity of a loop based network can be utilized more efficiently with a packed-based technology such as Ethernet.

However, there exists a problem that loops are not allowed in Ethernet-based transport networks, since Ethernet frames would circulate forever. So the loop has to be broken at some point, i.e. at some link between two nodes, so that Ethernet transport is enabled, thus e.g. facilitating MWR-based loop networks based on Ethernet.

Known solutions in the field of Ethernet-based loop and Ethernet loop protection like Resilient Packet Ring (RPR) and Ethernet Automatic Protection Switching (EAPS) do however not fit well with or are not giving the full benefit in hierarchical network architectures such as those of a radio access network, where there is no (or just a very limited amount of) traffic between the nodes in the loop and the main portion of traffic is upstream traffic.

In detail, Resilient Packet Ring (IEEE 802.17) is a complex layer-2 technology, which is independent of the underlying physical layer. The RPR concept is based on two counter-rotating rings designed to transport Ethernet frames efficiently e.g. in metro networks. There are no dedicated protection resources, and both rings transport traffic using shortest paths. RPR provides a fast protection switching (less than 50 ms). However, RPR's efficiency could be best utilized in networks and architectures, where the traffic is equally distributed between the nodes in the loop, but not in hierarchical (mobile) access networks.

Further, Ethernet Automatic Protection Switching (EAPS) is an exemplary solution for layer-2 loop protection, which is comparable to solutions such as Ethernet Protection Switched Rings (EPSR) and Ethernet Ring Protection (ERP). The solution has been documented in the informational Internet draft RFC3619. In this regard, it is to be noted that the terms loop and ring are to be understood as synonyms herein.

The EAPS ring consists of a master node and one or more transit nodes. The two ring ports of the master node are configured as primary port and secondary port. The master node blocks logically the secondary port except for a control VLAN (virtual local area network). The master node sends periodic health check packets from the primary port through the control VLAN towards the secondary port. When a fault occurs in the ring, the master detects this either by missing health check packets or by special fault detection packets generated by one of the transit nodes. In practice, the master node which is blocking the secondary port has to be located on the site where the traffic is forwarded upstream towards a controller. This is not optimal from load balancing point of view, especially in hierarchical architectures, such as for example hierarchical RAN architectures, because the optimal place for the break would be in the middle of the ring in respect of the master node. In addition, EAPS and similar solutions are on/off-type mechanisms without adaptation to available link capacities in the ring, therefore e.g. not allowing any load balancing. In a further known concept known as spanning tree, loops resulting from redundant paths are broken by use of the Spanning Tree Protocol (STP) algorithm. The STP breaks loops by disabling Ethernet switch ports so that the remaining active links build up a tree topology. In a failure case, when an active link breaks, STP calculates a new tree, taking then the appropriate so far disabled links into use. The original STP has meanwhile been superseded by the Rapid STP (RSTP), which converges faster. However, both STP and RSTP are on/off-type mechanisms without adaptation to available link capacities in the ring, therefore e.g. not allowing any load balancing.

Thus, the above solutions as such are mainly suitable for links with on/off characteristic, thus being not optimum for appropriately distributing the load across the working links of a loop.

Thus, a solution to the above problems and drawbacks is needed for providing a dynamic loop protection in communication networks.

SUMMARY OF THE INVENTION

Consequently, it is a concern of the present invention, for example, that it may remove at least some of the above drawbacks. It is a further concern of the present invention, for example, to provide accordingly improved loop protection.

According to a first aspect of the present invention, an embodiment of the present invention provides a method comprising dynamically determining a link connecting two adjacent nodes of a loop in a communication network in accordance with a predefined criterion, and reconfiguring the loop so that the loop is broken at the determined link.

According to a second aspect of the present invention, an embodiment of the present invention provides an apparatus comprising a link determination module configured to dynamically determine a link connecting two adjacent nodes of a loop in a communication network in accordance with a predefined criterion, and a reconfiguration module configured to reconfigure the loop so that the loop is broken at the determined link.

According to a third aspect of the present invention, an embodiment of the present invention provides an apparatus comprising means for dynamically determining a link connecting two adjacent nodes of a loop in a communication network in accordance with a predefined criterion, and means for reconfiguring the loop so that the loop is broken at the determined link.

According to a fourth aspect of the present invention, an embodiment of the present invention provides a computer program embodied in a computer-readable medium comprising program code, the computer program being configured to control a processor to dynamically determine a link connecting two adjacent nodes of a loop in a communication network in accordance with a predefined criterion, and to reconfigure the loop so that the loop is broken at the determined link.

Further developments and modifications are set out in the appended claims as attached herewith.

According to embodiments of the present invention, a loop such as e.g. an Ethernet loop may be dynamically broken at an optimal link with respect to instantaneous link capacities. In view of a corresponding optimization criterion, this could be done so that the capacity loss by loop breaking is minimized and so the available capacity in the loop is maximized. The location of the loop break may be dynamically and/or automatically adapted to changes in the instantaneous link capacities and/or to load conditions at the nodes of the loop. Further, besides any kind of link state protocol, a spanning tree algorithm such as e.g. STP and RSTP may be used. Thereby, a fast protection scheme may be provided, which may automatically and rapidly react on total link or node losses in addition to link condition changes.

According to embodiments of the present invention, there is provided a dynamic loop protection and load balancing mechanism, which is for example applicable to Ethernet switches in a loop structure.

The present invention and its embodiments are applicable, however not limited, to loop protection in a loop with packet-based traffic transport. This applies for example to an MWR-based and Ethernet-based loop in a communication network such as for example a radio/mobile access network.

BRIEF DESCRIPTION OF THE DRAWINGS

In the following, the present invention and its embodiments will be described in greater detail with reference to the accompanying drawings, in which.

DETAILED DESCRIPTION OF EMBODIMENTS OF THE PRESENT INVENTION

The present invention and exemplary embodiments thereof are described herein below with reference to the drawings representing particular non-limiting examples thereof. A person skilled in the art will appreciate that the invention is not limited to these examples, and may be more broadly applied.

In particular, the present invention and exemplary embodiments thereof are described in relation to a loop structure (as e.g. depicted in FIG. 1) which is independent of the overall network architecture. That is, although it is referred only to the loop, the overall architecture of the underlying communication network may for example also be a network of chain, star, loop or mesh architecture/topology, in which the loop represents only a part of the overall connectivity. It is to be noted that the term loop is to be understood as a synonym for the term ring, so the description as well be transferable to any kind of rings in any kind of underlying networks. Further, Ethernet is used as an example of a packet-based transport technology for traffic transport on links of the loop, whereas any other kind of packet-based transport technology may also be uses, as long as it complies with the conditions described. Moreover, if any kind of protocol, denomination of any technology or the like is used hereinafter, it is to be understood that thus described aspects may also be applied to/with another protocol, technology or the like, as long as it is feasible to this extent.

As such, the description of the embodiments given herein specifically refers to terminology which is directly related to those examples. Such terminology is only used in the context of the presented examples, and is not intended to limit the invention in any way.

For facilitating the description of the present invention and its embodiments, this will be based on a non-limiting, but merely illustrative example topology of a loop within a communication network such as a radio access network (RAN).

Figure 1:
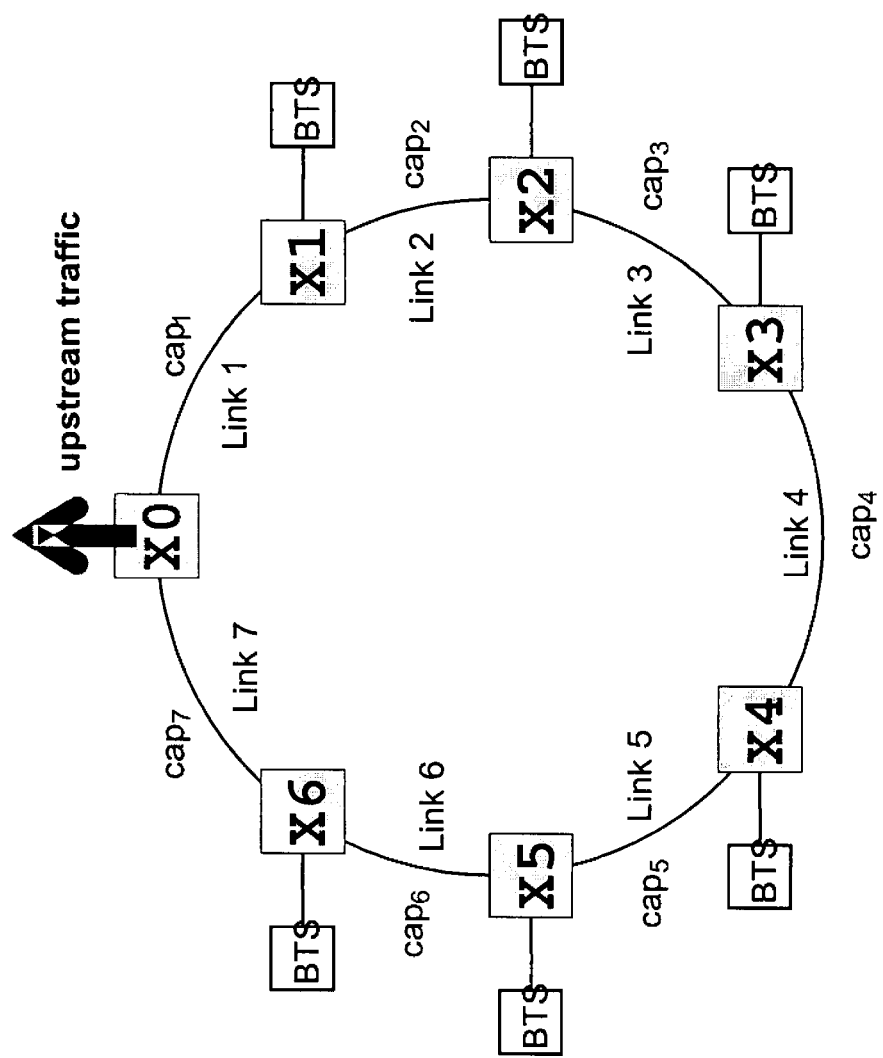
FIG. 1 shows a schematic diagram of a loop structure on which embodiments of the present invention are applicable.

FIG. 1 shows a schematic diagram of a loop structure on which embodiments of the present invention are applicable. It is noted that FIG. 1 only illustrates one non-limited example structure with one master node and six transit nodes, while any number of transit nodes is possible as long as a loop structure is given.

A node X0 in FIG. 1 is assumed to represent a master node of the loop interconnecting the set of nodes X0 to X6 with each other. The master node also referred to as loop master is presumed to represent an interface to the outside of the loop and a central control entity for the nodes of the loop. In FIG. 1, it is indicated that upstream traffic of the loop is sent via the master node. Another term for "upstream" as used herein could for example be "aggregate" (i.e. all traffic from nodes X1 to X6 is aggregated onto this single interface at node X0). According to embodiments of the present invention, such upstream traffic may for example include, but is not limited to, high speed packet access (HSPA) traffic. The upstream traffic may e.g. be directed to a network element such as a base station controller (BSC) or a radio network controller (RNC). Such a network element is located upstream in mobile radio access networks used as an example herein, and the connection thereto may also be an Ethernet connection or some other kind of transport interface. Each pair of two nodes is connected by way of a link which may be any kind of link, for example a micro-wave radio (MWR) link, and may be based on any kind of transport technology, for example Ethernet technology. In the depicted example, the nodes X1 to X6 in the loop (or ring) are exemplarily connected with a base station (BTS: base transceiver station) of a radio access network. The nodes X1 to X6 might be integrated in the base station, so it could be assumed that the base stations as such may represent the nodes of the loop. Each link has certain link conditions including bandwidth and the like, which in the following are denoted as link capacities. The link capacities may vary over time, and are basically independent of each other.

Figure 2:
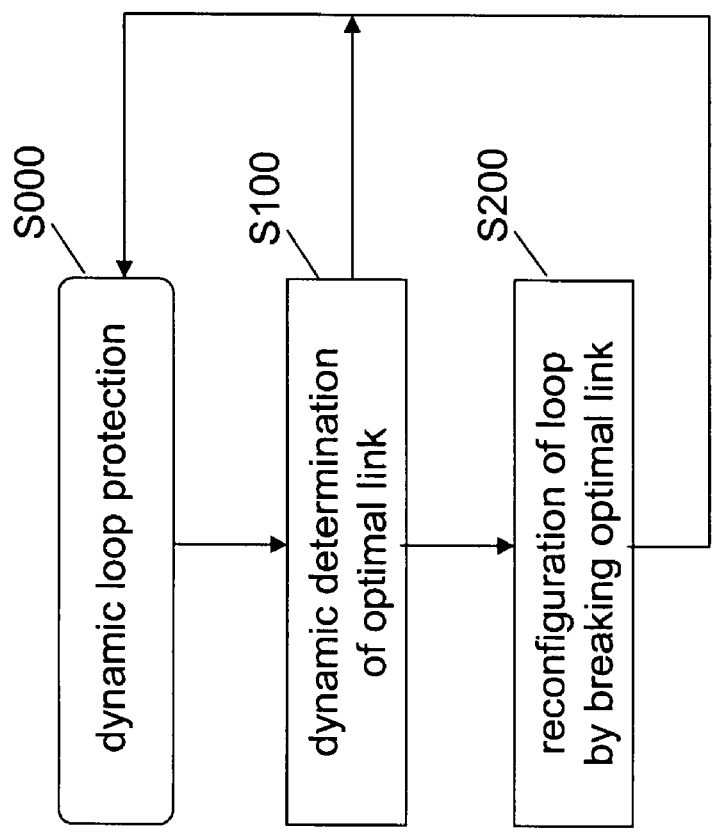
FIG. 2 shows a flowchart of a basic method according to an embodiment of the present invention.

FIG. 2 shows a flowchart of a basic method according to an embodiment of the present invention.

A method according to the present embodiment is denoted as dynamic loop protection S000. It may be executed by the master node X0 according to FIG. 1. In a first step S100, there is dynamically determined an optimal link at which the loop is to be broken, i.e. a preferred loop break point. In this regard, dynamically means that the execution of this procedure may be triggered dependent on time-varying conditions, as is explained below in detail. An optimal link means one of the links of the loop, which optimizes a predefined criterion. As an example, an optimization criterion as used herein may be that the available capacity in the loop is distributed between the nodes in the loop as equal and fair as possible. This can for example be achieved by maximizing the minimum capacity of one node (or base station) in the loop. In this context, minimum capacity means the lowest capacity share that one node in the loop could get. However, any kind of optimization criterion may be used. After determination of the optimal link, the loop is reconfigured so as to be broken at the determined optimal link (step S200). Reconfiguration of the loop includes a reconfiguration of at least one of the nodes in the loop, as is explained below in detail.

As is evident from FIG. 2, the dynamic loop protection operation may return to the beginning either from step S100 or from step S200. Details on this returning will be explained in connection with FIGS. 5, 7, 8, 10 and 11 below.

Figure 3:
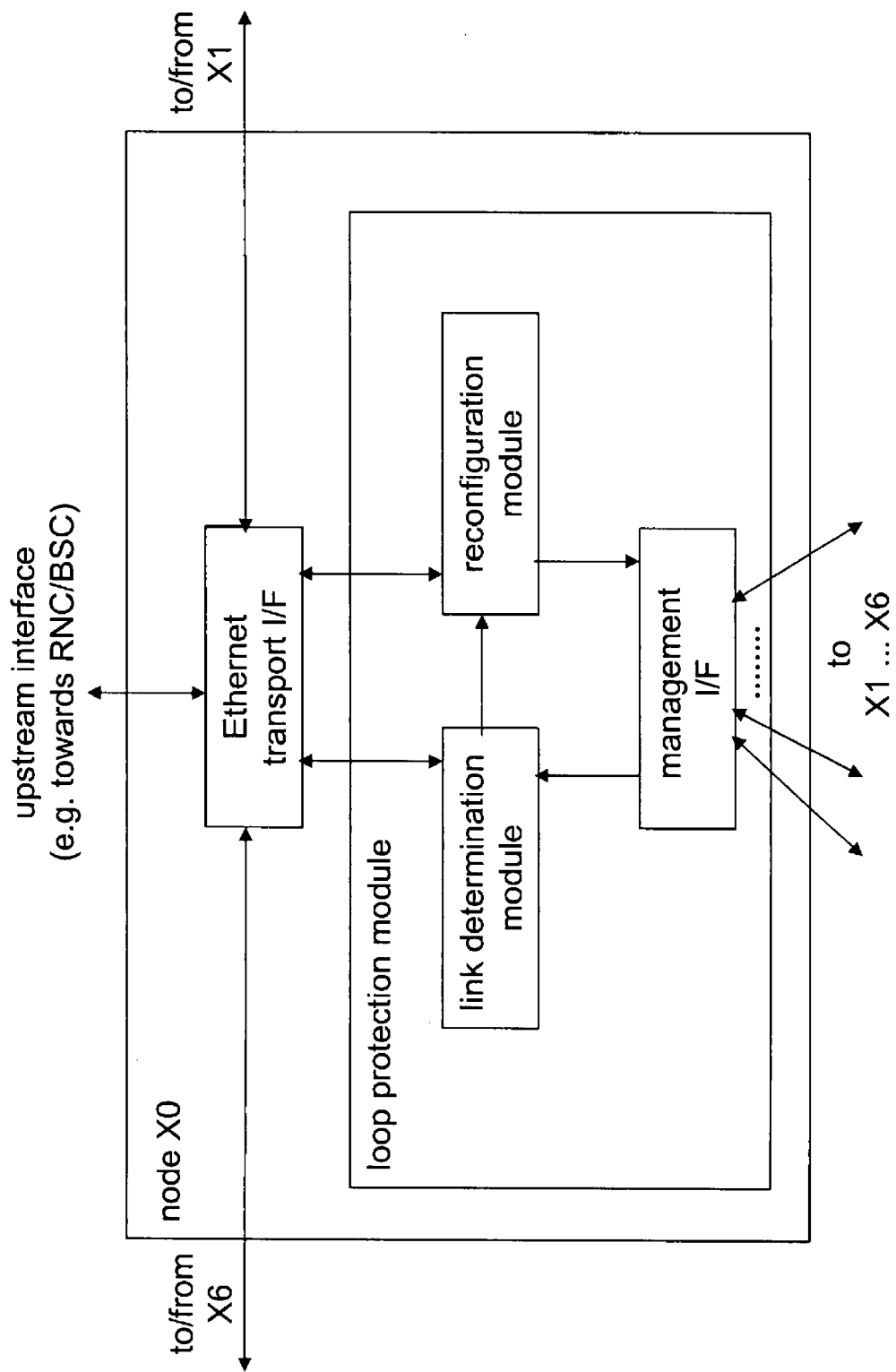
FIG. 3 shows a schematic block diagram of an apparatus according to an embodiment of the present invention.

FIG. 3 shows a schematic block diagram of an apparatus according to an embodiment of the present invention.

In the assumption that the method according to FIG. 2 is performed by node X0 according to FIG. 1, i.e. the master node of the loop, the apparatus of the present embodiment is, comprises or is comprised of the master node X0.

Figure 12:
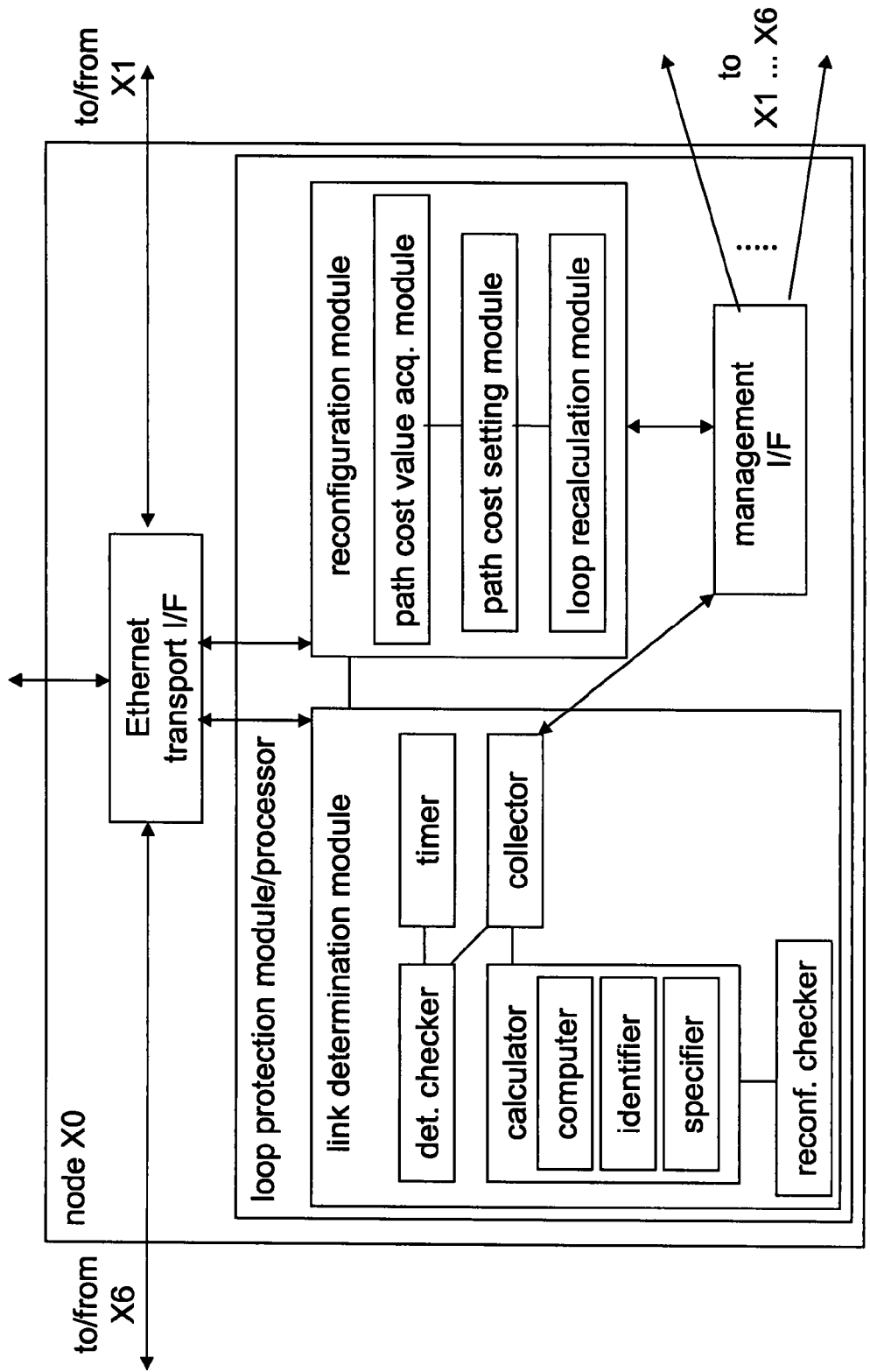
FIGS. 12 and 13 show schematic block diagrams of first and second examples of an apparatus according to an embodiment of the present invention, respectively.
Figure 13:
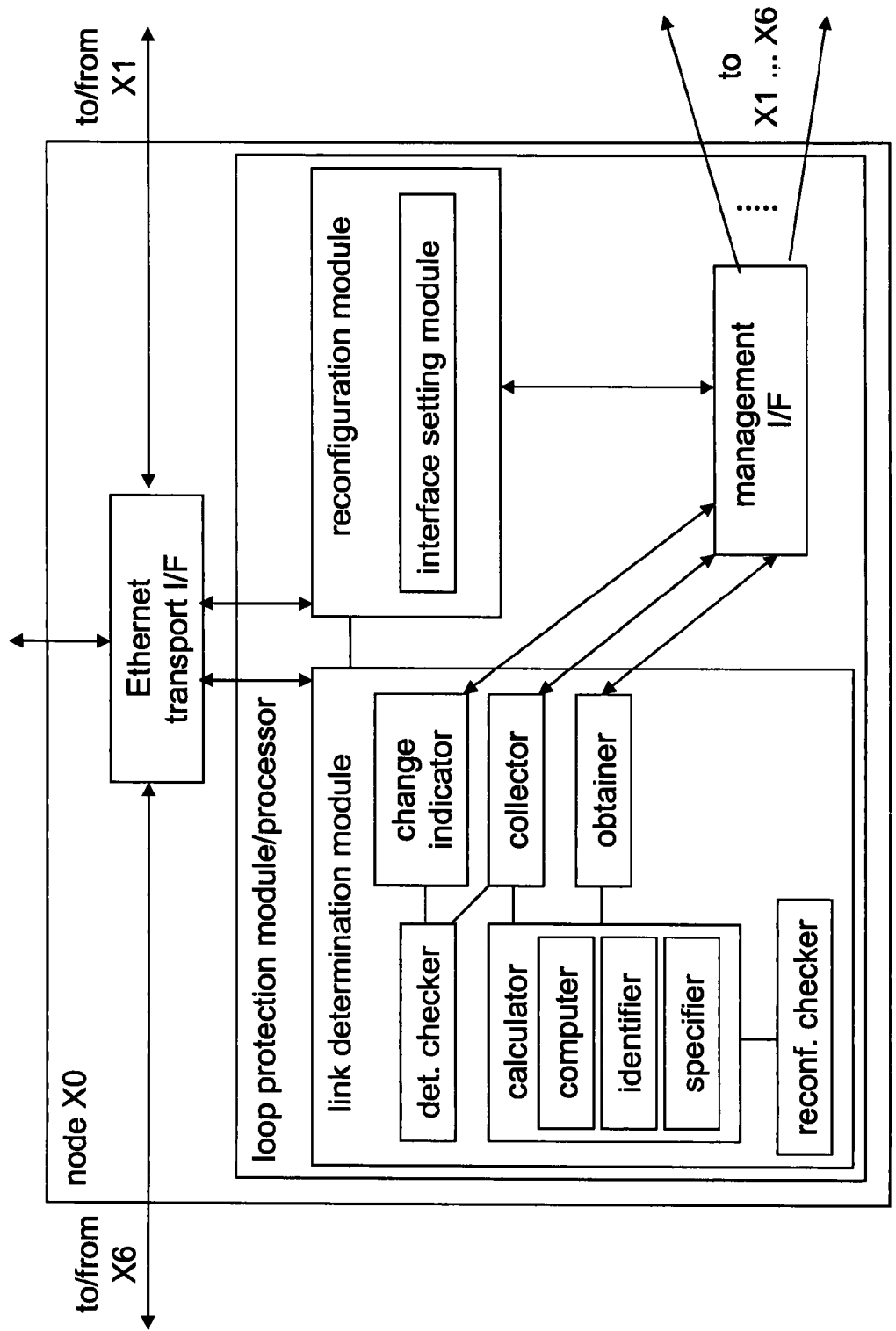

For traffic transport by way of Ethernet with neighboring nodes X1 and X6, the apparatus comprises an Ethernet transport interface. This Ethernet transport interface is also configured for communication with an upstream controller (e.g. a base station controller or a radio network controller) in the upward direction. The Ethernet transport interface is shown for simplification reasons in FIGS. 3, 12 and 13 just as one block. In practice there might be separate Ethernet interface blocks for each physical Ethernet interface (e.g. towards X1, X6 and the upstream interface in FIG. 3) with a switching function in-between. For management communication with any node of the loop, i.e. nodes X1 to X6, the apparatus comprises a management interface. It is however to be noted that these interfaces are merely for realizing respective communications from a transport point of view, and do not comprise specific functionality according to the present invention, if not mentioned explicitly. Further on the shown management interface in FIGS. 3, 12 and 13 represents a logical interface and the management traffic towards the nodes X1 to X6 could also be carried inband via the Ethernet links in the loop.

According to the present embodiment, the apparatus comprises a loop protection module configured to perform the loop protection method of step S000 according to FIG. 2. This module comprises a link determination module for performing the procedure of step S100 in FIG. 2, which may also be referred to as means for dynamically determining a link connecting two adjacent nodes of a loop in accordance with a predefined criterion, i.e. an optimal link. The loop protection module further comprises a reconfiguration module for performing the procedure of step S200 in FIG. 2, which may also be referred to as means for reconfiguring the loop so that the loop is broken at the determined (optimal) link. To this end, the link determination module, the reconfiguration module and the management interface (which may also be regarded as a part of the loop protection module, but does not necessarily has to be a part thereof) interact with each other, as indicated by the arrows there-between and described in detail in the following. Furthermore, the link determination module and the reconfiguration module are bi-directionally connected to the Ethernet transport interface. These connections may for example be used for reading link capacity information for local Ethernet interfaces and/or for controlling local Ethernet interfaces of the present node (for details in this regard, see below).

FIGS. 4A to 4D show schematic diagrams of a loop structure and procedures therein, where embodiments of the present invention are applicable. That is, individual aspects of the method and apparatus of the present invention are exemplarily depicted and described by way of FIGS. 4A to 4D.

Figure 5:
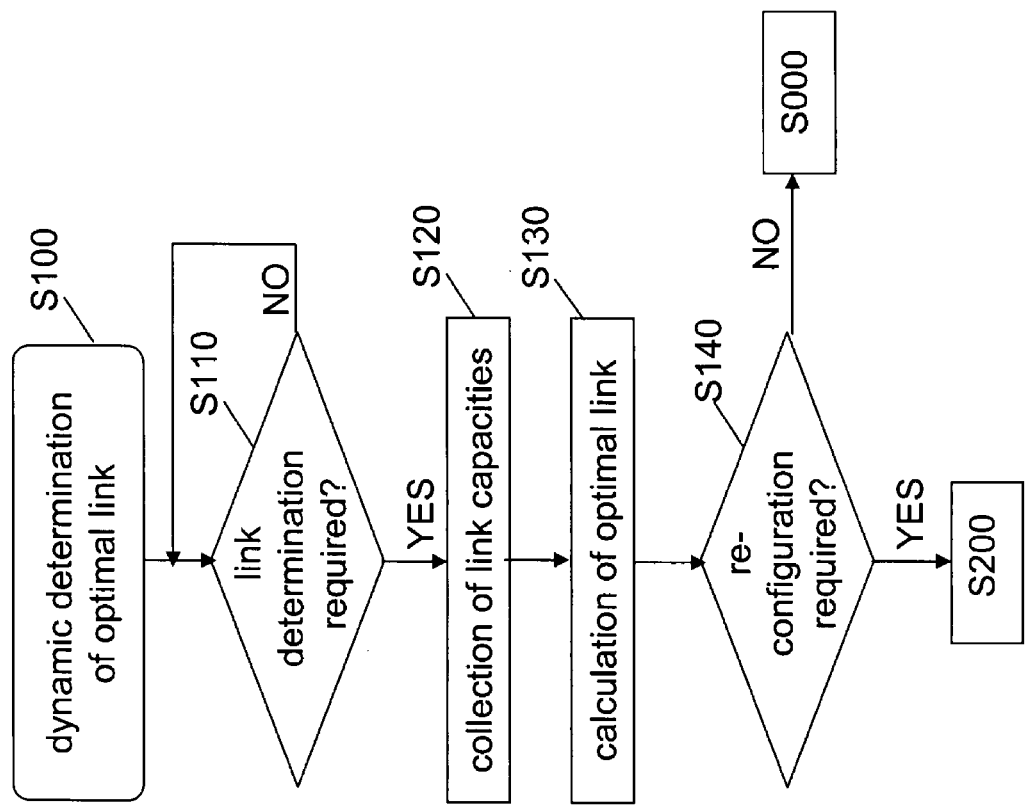
FIG. 5 shows a flowchart of a method of dynamic link determination according to an embodiment of the present invention.
Figure 6:
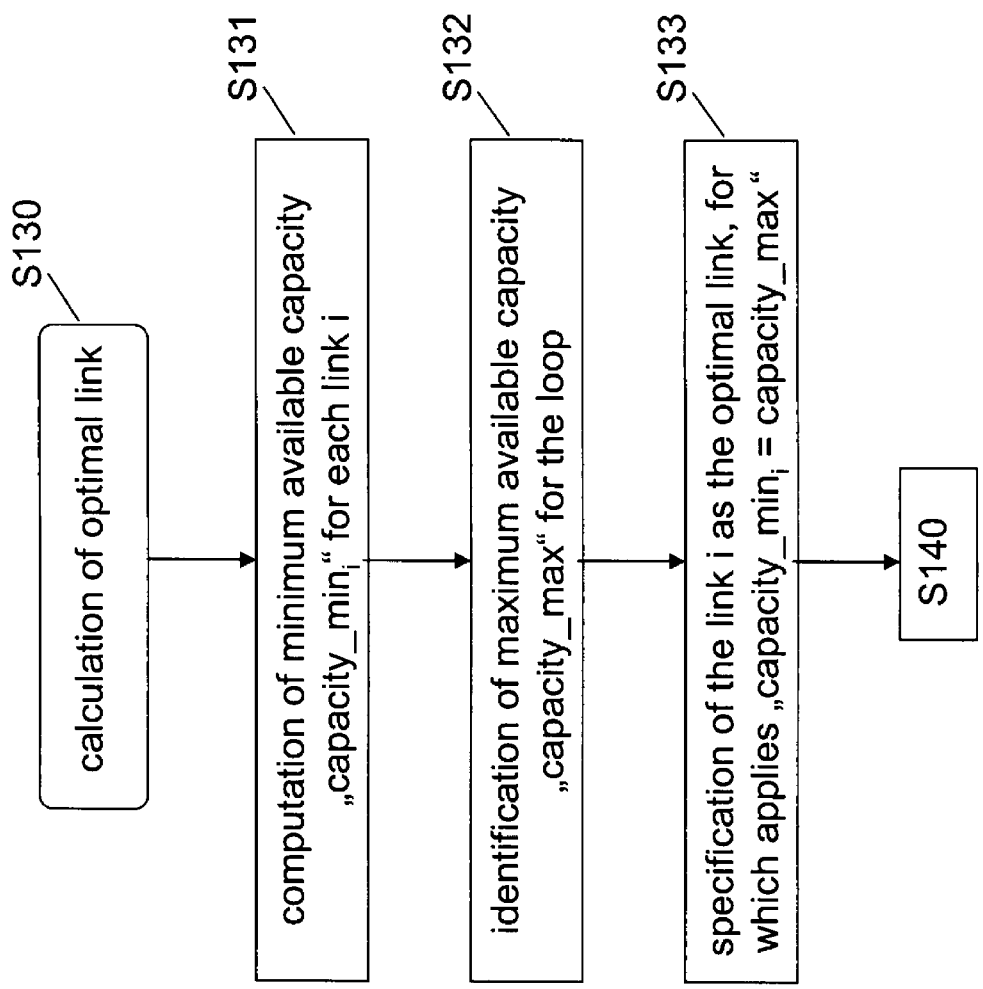
FIG. 6 shows a flowchart of a method of link calculation according to an embodiment of the present invention.
Figure 7:
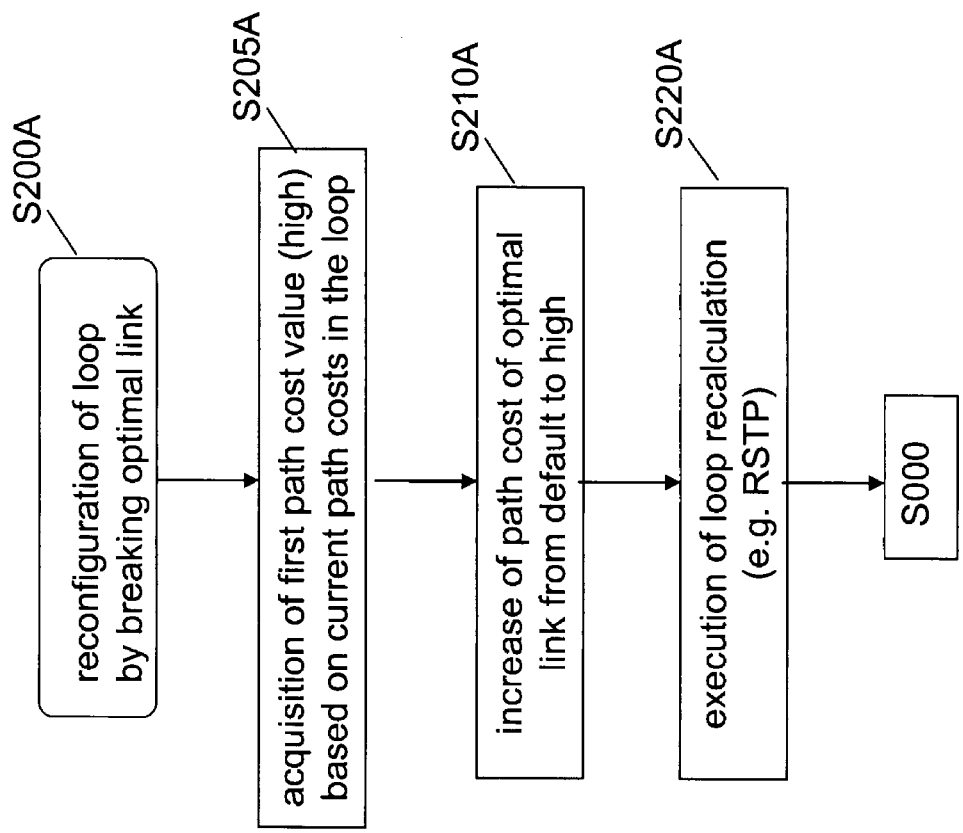
FIGS. 7 and 8 show flowcharts of a first and a second example of a method of loop reconfiguration according to an embodiment of the present invention, respectively.
Figure 8:
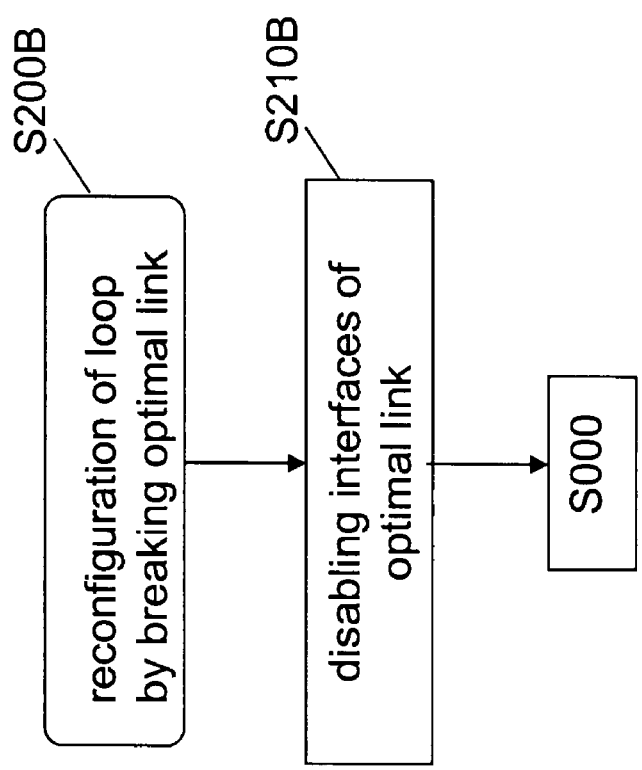

In parallel, reference is made to FIGS. 5 to 8, wherein FIG. 5 shows a flowchart of a method of dynamic link determination according to an embodiment of the present invention, FIG. 6 shows a flowchart of a method of link calculation according to an embodiment of the present invention, and FIGS. 7 and 8 show flowcharts of a first and a second example of a method of loop reconfiguration according to an embodiment of the present invention, respectively.

Figure 4A:
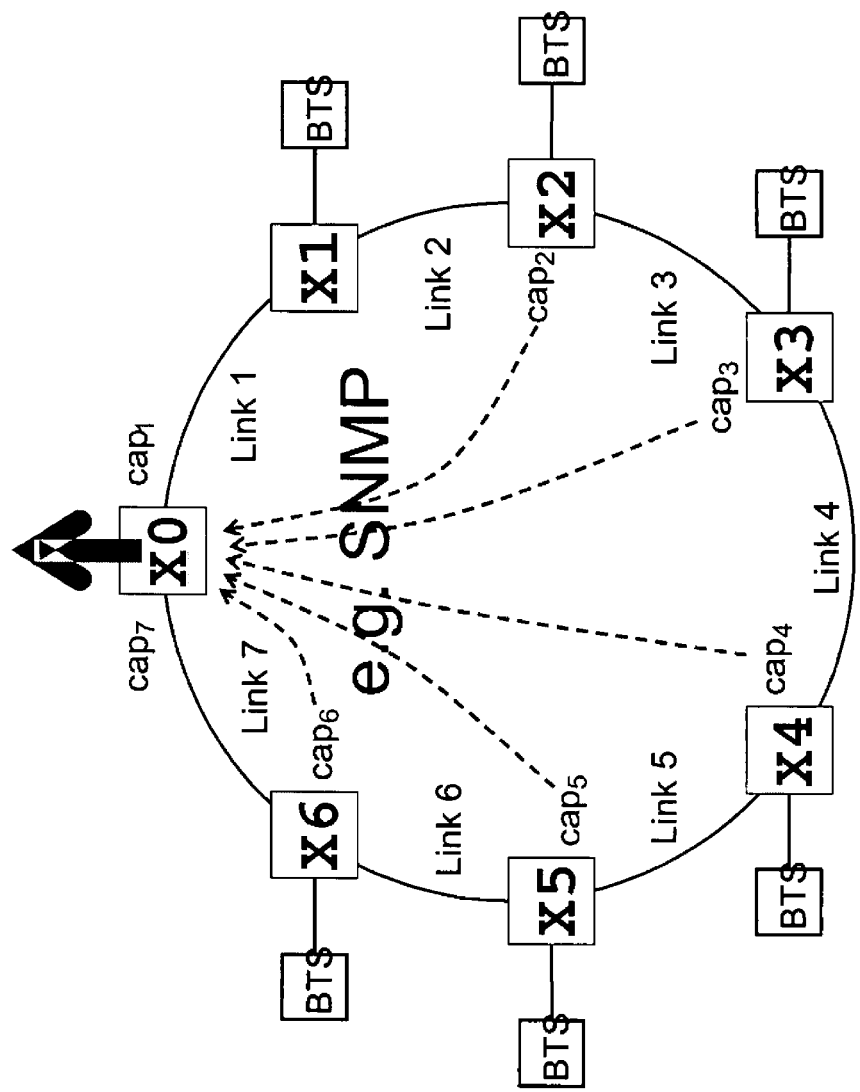
FIGS. 4A to 4D show schematic diagrams of a loop structure and procedures therein, where embodiments of the present invention are applicable.
Figure 4B:
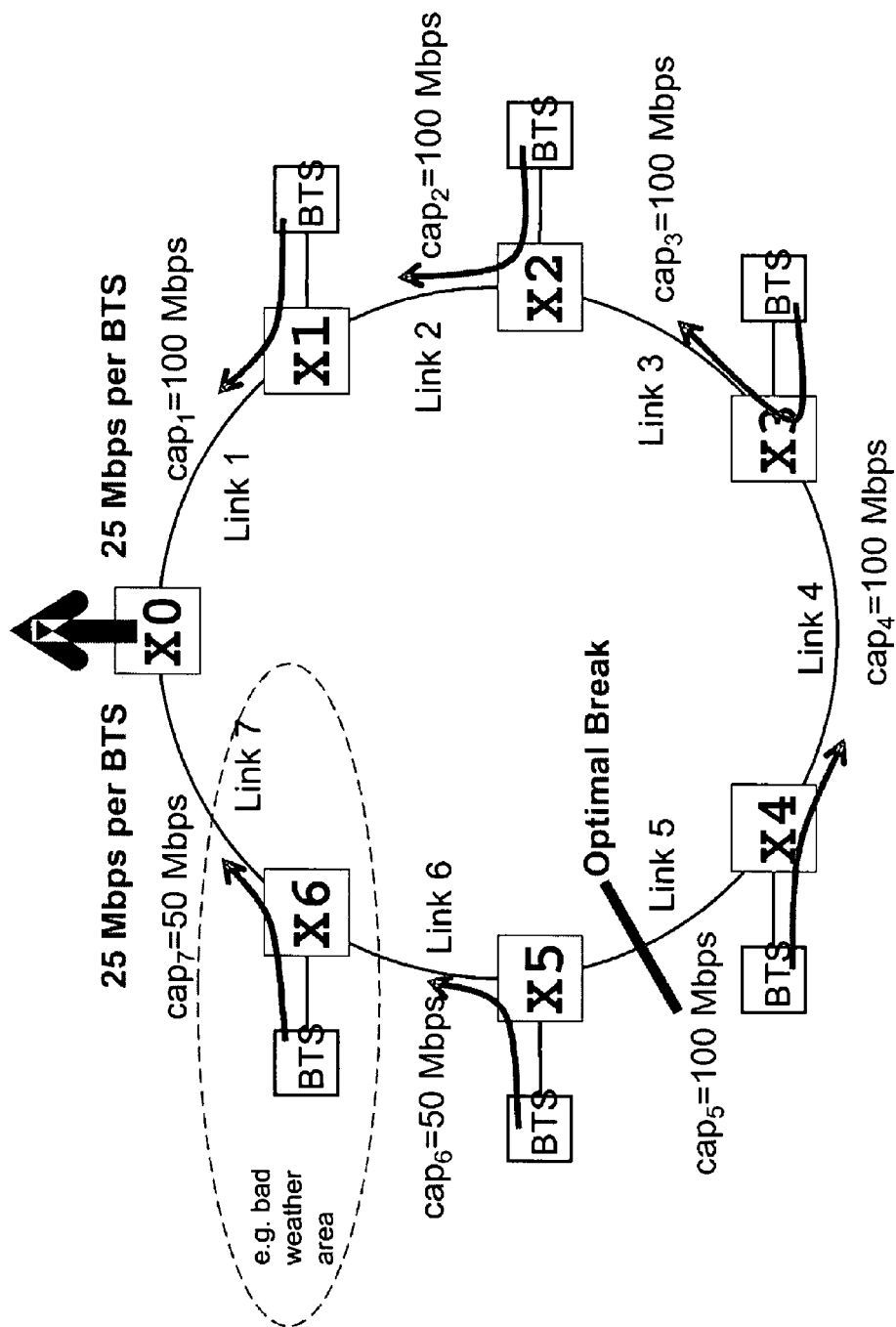
Figure 4C:
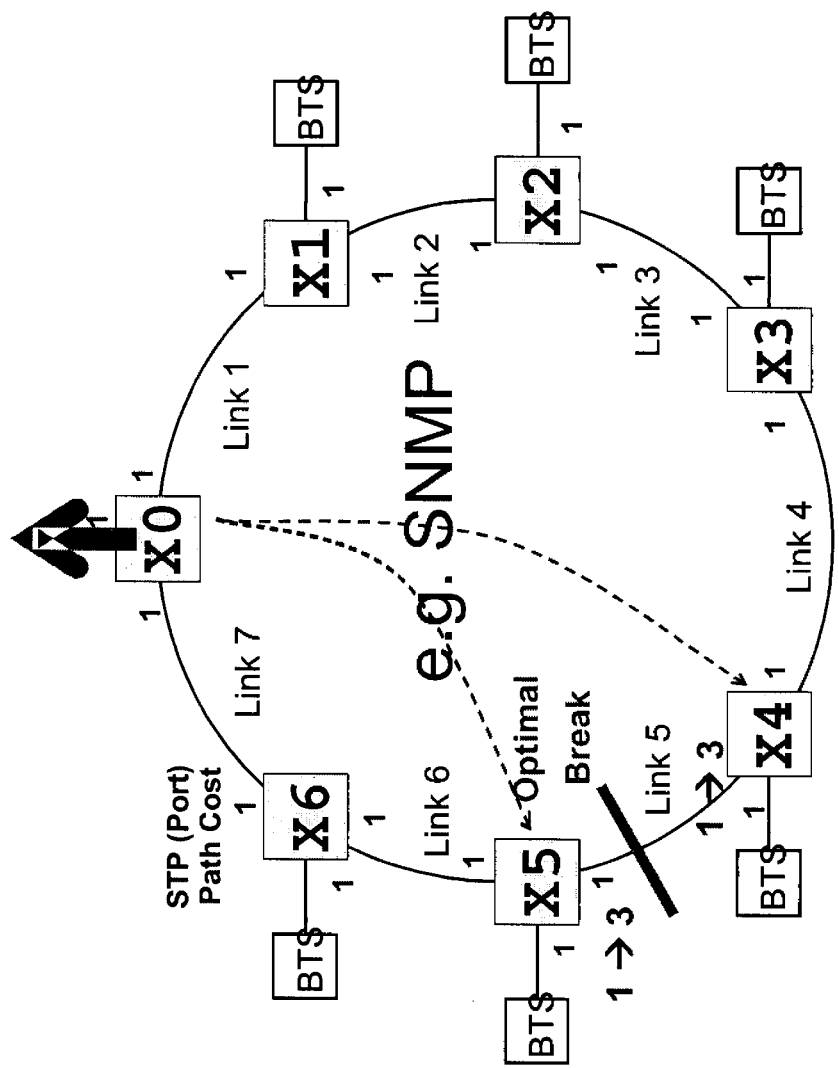
Figure 4D:
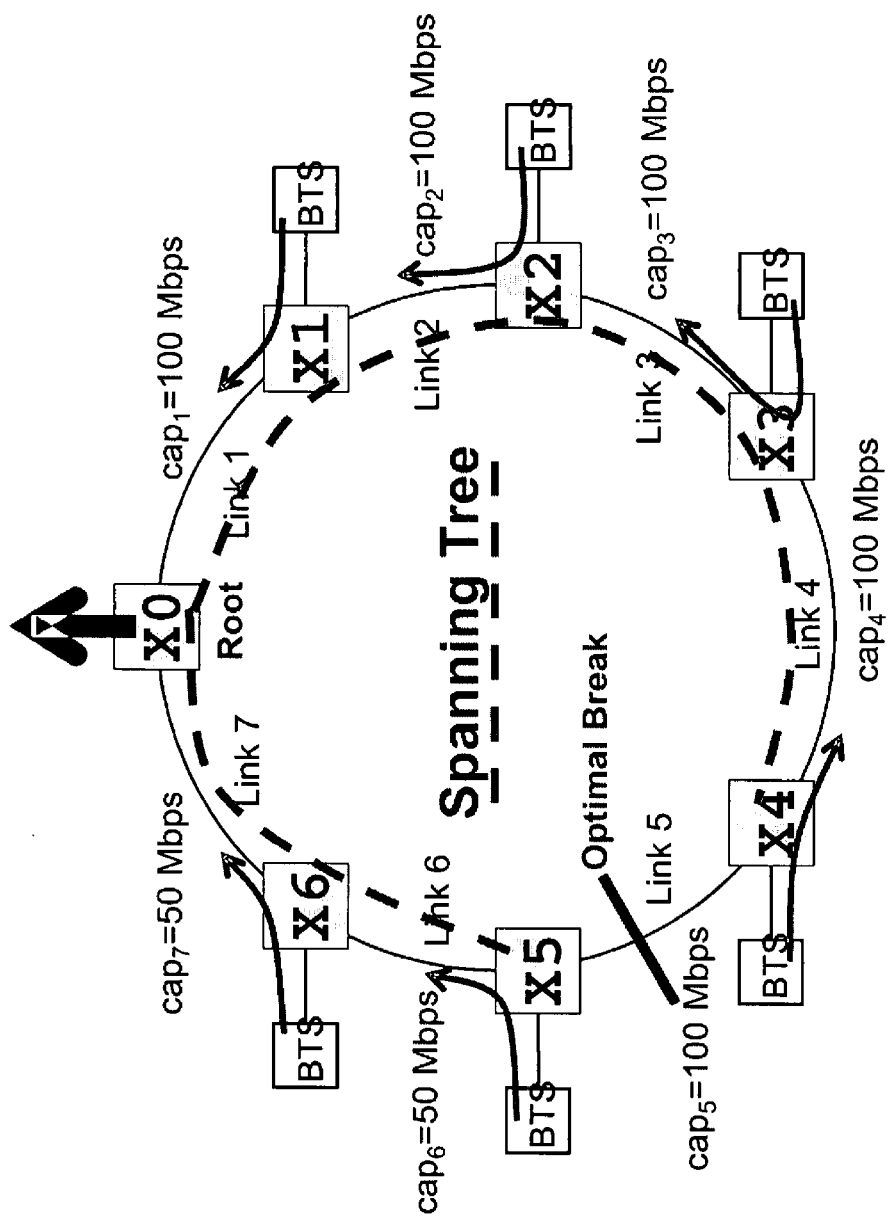

In FIGS. 4A and 4B, there are depicted details of a dynamic determination of an optimal link according to an embodiment of the present invention, also illustrated by FIGS. 5 and 6. In FIGS. 4C and 4D, there are depicted details of a loop reconfiguration by breaking at the optimal link according to an embodiment of the present invention, also illustrated by FIGS. 7 and 8.

As shown in FIG. 4A, the master node X0 first collects link capacities of each link of the loop (cf. step S120 of FIG. 5). Namely, by way of a remote management connection to the other nodes, as e.g. the management interface and/or the Ethernet transport interface according to FIG. 3, the master node reads out the instantaneous link capacities $cap_1 \ldots cap_7$. As the master node itself is connected to links 1 and 7, thus being aware of the respective link capacities $cap_1$ and $cap_7$, only link capacities $cap_2$ to $cap_6$ are read out from nodes X2 to X6. The collection of link capacities may for example be implemented by way of a standard management protocol such as for example SNMP (Simple Network Management Protocol), as indicated in FIG. 4A, or by way of any dedicated protocol.

On the basis of the thus collected link capacities, the master node than calculates a link for breaking the loop in accordance with a predefined criterion, i.e. an optimal link (cf. step S130 of FIG. 5). In the following, it is exemplarily assumed that the criterion is that the minimum capacity of one node (or base station) in the loop is maximized.

According to an embodiment of the present invention, the following algorithm may be used to this extend (cf. FIG. 6).

Firstly, see step S131 of FIG. 6, for all N links, i.e. link i with i=1 ... N, a minimum of an available capacity of a node, when the loop is broken at link i, is computed. This may be done by way of the following equations.

$$capacity\_min_1 = MIN\{cap_1/0, cap_2/1, cap_3/2, cap_4/3, cap_5/4, cap_6/5, \ldots cap_N/(N-1)\},$$

$$capacity\_min_2 = MIN\{cap_1/1, cap_2/0, cap_3/1, cap_4/2, cap_5/3, cap_6/4, \ldots cap_N/(N-1)\},$$

$$capacity\_min_3 = MIN\{cap_1/1, cap_2/0, cap_3/1, cap_4/2, cap_5/3, cap_6/4, \ldots cap_N/(N-2)\},$$

...

$$capacity\_min_N = MIN\{cap_1/N-1, cap_2/N-2, cap_3/N-3, cap_4/N-4, cap_5/N-5, cap_6/N-5, \ldots cap_N/0\}.$$

It is to be noted that a division by zero is assumed to yield infinity, thus the respective link is not taken into account by the algorithm.

The assumption is that the nodes shall share the link capacities in a fair manner. The term "$capacity\_min_i$" is then the available capacity of the node (or nodes) with the least available capacity in the loop, when the loop is broken at the link with the number i.

Secondly, see step S132 of FIG. 6, for the whole loop as such, an overall maximum of the available minimum capacities for each link is identified. That is:

$$capacity\_max = MAX\{capacity\_min_1, capacity\_min_2, \ldots, capacity\_min_N\}.$$

Thirdly, see step S133 of FIG. 6, as the optimal link, there is specified that link i whose minimum available capacity calculated corresponds to the overall maximum capacity identified. That is the optimal solution in accordance with the above-mentioned criterion is to break the loop at link i with:

$$capacity\_min_i = capacity\_max.$$

Thereby, the available minimum capacity of the nodes in the loop is maximized.

For a better understanding of the above algorithm for optimal link calculation, the following two examples are given.

Example 1 is based on the loop structure according to FIG. 1 or FIG. 4A, having one master node and six transit nodes, with the assumption that all link capacities are the same (=capacity).

Firstly:

$$capacity\_min_1 = capacity*MIN\{1/0, 1/1, 1/2, 1/3, 1/4, 1/5, 1/6\} = capacity/6$$

$$capacity\_min_2 = capacity*MIN\{1/1, 1/0, 1/1, 1/2, 1/3, 1/4, 1/5\} = capacity/5$$

$$capacity\_min_3 = capacity*MIN\{1/2, 1/1, 1/0, 1/1, 1/2, 1/3, 1/4\} = capacity/4$$

$$capacity\_min_4 = capacity*MIN\{1/3, 1/2, 1/1, 1/0, 1/1, 1/2, 1/3\} = capacity/3$$

$$capacity\_min_5 = capacity*MIN\{1/4, 1/3, 1/2, 1/1, 1/0, 1/1, 1/2\} = capacity/4$$

$$capacity\_min_6 = capacity*MIN\{1/5, 1/4, 1/3, 1/2, 1/1, 1/0, 1/1\} = capacity/5$$

$$capacity\_min_7 = capacity*MIN\{1/6, 1/5, 1/4, 1/3, 1/2, 1/1, 1/0\} = capacity/6$$

Secondly:

$$capacity\_max = capacity*MAX\{1/6, 1/15, 1/4, 1/3, 1/4, 1/5, 1/6\} = capacity\_min_4 = capacity/3$$

Thirdly:

$$capacity\_min_i = capacity\_max => \text{optimal loop break: link4}$$

Example 2 is based on the loop structure according to FIG. 4B, again having one master node and six transit nodes, with the assumption that not all link capacities are the same. Namely, as may be seen from FIG. 4B, it is assumed that links 1 to 5 have a capacity of 100 Mbps each, and links 6 and 7 have a capacity of 50 Mbps each due to bad weather conditions in the area of node X6, as indicated by a broken line.

Firstly:

$$capacity\_min_1 = 100Mbps*MIN\{1/0, 1/1, 1/2, 1/3, 1/4, 0.5/5, 0.5/6\} = 8.33Mbps$$

$$capacity\_min_2 = 100Mbps*MIN\{1/1, 1/0, 1/1, 1/2, 1/3, 0.5/4, 0.5/5\} = 10Mbps$$

$$capacity\_min_3 = 100Mbps*MIN\{1/2, 1/1, 1/0, 1/1, 1/2, 0.5/3, 0.5/4\} = 12.5Mbps$$

$$capacity\_min_4 = 100Mbps*MIN\{1/3, 1/2, 1/1, 1/0, 1/1, 0.5/2, 0.5/3\} = 16.66Mbps$$

$$capacity\_min_5 = 100Mbps*MIN\{1/4, 1/3, 1/2, 1/1, 1/0, 0.5/1, 0.5/2\} = 25Mbps$$

$$capacity\_min_6 = 100Mbps*MIN\{1/5, 1/4, 1/3, 1/2, 1/1, 0.5/0, 0.5/1\} = 20Mbps$$

$$capacity\_min_7 = 100Mbps*MIN\{1/6, 1/5, 1/4, 1/3, 1/2, 0.5/1, 0.5/0\} = 16.66Mbps$$

Secondly:

capacity_max=capacity_min$_5$=25Mbps

Thirdly:

capacity_min$_i$=capacity_max=>optimal loop break: link5

As a result, after breaking the loop at the calculated optimal link, as described in detail below, each node has now at least 25 Mbps available. Namely, nodes "left" of the broken link, send clockwise, i.e. two nodes X5 and X6, having a capacity of 50 Mbps/2=25 Mbps each. And nodes "right" of the broken link, send counter-clockwise, i.e. four nodes X1 to X4, having a capacity of 100 Mbps/4=25 Mbps each.

Thereby, in the example of FIG. 4B an efficient load balancing has been achieved as compared with known solutions. For example, a conventional spanning tree algorithm would result in that the three nodes on the left side of the loop would have to share the 50 Mbps of link 7, i.e. they would only have 16.66 Mbps each. This is due to the fact that the spanning tree algorithm (in a default configuration with equal path costs) would determine link 4 as the link for loop breaking, and would not be able to adapt to the changed link capacities due to the assumed bad weather area.

According to an alternative embodiment of optimal link calculation according to the present invention, the calculation may also take into account load measures of each node of the loop. Such load measure could for example include an actual load situation and current load demands of the individual nodes in the loop.

To this end, the node count integers used as denominators in the above formulas for computing the minimum of an available capacity of a node, when the loop is broken at link i, for each link i, may be replaced by a load measure, e.g. the actual measured (or predefined or assumed or estimated) loads per site/node.

If for example Load ($B_N$) represents the load at site/node N, the above formula capacity_min$_1$=MIN{cap$_1$/0,cap$_2$/1,cap$_3$/2,cap$_4$/3, cap$_5$/4,cap$_6$/5, ... cap$_N$/($N$−1)} would be replaced by the modified formula:

capacity_min$_1$=MIN{cap$_1$/0,cap$_2$/Load($B_1$),cap$_3$/Load($B_1$+$B_2$),cap$_4$/Load($B_1$+$B_2$+$B_3$),cap$_5$/Load($B_1$+$B_2$+$B_3$+$B_4$),cap$_6$/Load($B_1$+$B_2$+$B_3$+$B_4$+$B_5$), ... cap$_N$/Load($B_1$+$B_2$ ... $B_{N-1}$)}.

As a matter of course, similar replacements also apply for the formulas for capacity_min$_2$ to capacity_min$_N$.

In order to implement such a modified optimal link calculation, the respective load measures of all nodes of the loop are to be obtained by the master node. This could for example be effected in the same way as or even in parallel with the collection of link capacities as described above.

It is to be noted that, according to both above-mentioned alternative embodiments of optimal link calculation according to the present invention (i.e. with link capacities and with a combination of link capacities and load measures), there might arise a case where the calculation leads to two adjacent links being equally optimal for loop breaking. In such a case, the optimal link determination yields that link as a result, which is closer to the loop bottom (i.e. the link which is less far from the master node). In this regard, a measure for closeness may for example be based on a number of hops/links, a physical distance, or any other conceivable parameter between the master node and the adjacent links being equally optimal for loop breaking.

Two further notes are to be made with regard to the optimal link determination as described above.

i) The master node needs to read out the instantaneous link capacities regularly. This could be done with a dedicated protocol, but also with a standard management interface as e.g. SNMP, as mentioned above. On the one hand, regular could mean that the nodes of the loop are periodically polled by the master node, wherein a requirement for collecting link capacities is based on a predefined time period, e.g. every 30 seconds. On the other hand, regular could also mean that a collection of link capacities is triggered by link capacity changes received by the master node from the transit nodes e.g. by way of path link change indications flagged by the transit nodes. As an alternative in accordance with the above, regular could also mean that a collection of link capacities and load measures is triggered by load measure changes received by the master node from the transit nodes e.g. by way of load measure change indications flagged by the transit nodes. That is, even when the link capacities remain unchanged, an optimal link calculation may be initiated due to changed load measures at least one of the transit nodes of the loop. Stated in other words, the link determination process is repeated dynamically (e.g. in fixed intervals) or when capacity changes and/or load measure changes in the loop are indicated to the master node, i.e. on demand. Accordingly, before execution of link capacity collection and optimal link calculation procedures, a requirement o-a link determination may be checked (cf. step S110 of FIG. 5). Such a check may hence be based on at least one of a predefined time period, link capacity changes of links of the loop, and load measure changes of nodes of the loop. It is to be noted that this step is optional, and may thus be skipped.

ii) In order to avoid too frequent reconfigurations in the loop, which could lead to instability, a requirement for loop recalculation may be decided based on a calculation result of step S130. The master node may thus filter the calculated optimal link. For example, it could be decided that no loop reconfiguration is executed, if the calculated optimal link has only changed to a small extent, e.g. by one link to the left or right direction. This may be detected by applying a hysteresis curve to the newly calculated optimal link result as compared with the previous optimal link, for example. Then, a requirement of a loop reconfiguration may be checked accordingly (cf. step S140 of FIG. 5). If no reconfiguration of the loop is required, then the process returns to the beginning of the overall process, i.e. to step S000 of FIG. 2. If a reconfiguration of the loop is required, then the process advances to step S200 of FIG. 2. It is to be noted that step S140 is optional, and may thus be skipped. If step S140 is skipped, after execution of the operation of step S133 of FIG. 6, the process would directly advance to step S200 instead of to step S140.

As regards loop reconfiguration, as shown in FIG. 4C, after having run the optimal link calculation as described above, resulting in link 5 to be the optimal link, the master node X0 knows the optimal link at which the loop should be broken. Via the remote management connection, e.g. the management interface according to FIG. 3, the master node reconfigures the loop such that it is broken at the optimal link.

According to a first option (cf. FIG. 7), the loop reconfiguration could be achieved using a link state protocol such as for example the (Rapid) Spanning Tree Protocol (RSTP/STP) or the Open Shortest Path First Protocol (OSPF). These algorithms are path cost based algorithms.

In this case, the master node acquires a first path cost value based on current values of path cost parameters of the links of the loop (cf. step S205A of FIG. 7). The thus acquired first path cost value, also referred to hereinafter as 'high', is set such that it is assured that a link having this first path cost value will be broken in the ongoing loop reconfiguration process. The individual values of path cost parameters of the loop may be obtained through the management interface as e.g. shown in FIGS. 3, 12 and 13, by way of any kind of management protocol.

Then, the master node accesses the two adjacent transit nodes connected to the calculated optimal link (here: one of nodes X4 and X5 as adjacent nodes to link 5), and increases the nodes' path costs for the corresponding port towards the optimal link to the first path cost value previously acquired, or to a path cost value higher than the acquired one (cf. step S210A of FIG. 7). In the example of FIG. 4C, the path cost parameter of node X4 at the left-hand side port is increased from 1 to 3, wherein 1 is an example for a default value and 3 is an example of a high value.

This setting triggers a loop recalculation (cf. step S220A of FIG. 7). In the present example using RSTP/STP as link state protocol, a recalculation of the spanning tree of the loop is thus triggered and executed, thus breaking the loop at the determined optimal link 5 (see FIG. 4D). Because of the high path cost of link 5, RSTP/STP will not use link 5 and break the loop there. In case the master node has a direct connection to the optimal link, i.e. the optimal link is either link 1 or link 7, the master node can directly increase the path cost at its corresponding port and trigger the RSTP recalculation then. In the loop recalculation based on spanning tree concepts, the node X0 acts as the root node. After loop reconfiguration, the process returns to the beginning of the overall process, i.e. to step S000 of FIG. 2.

Using for example RSTP for loop reconfiguration has the benefit to have a fast protection scheme in place, which automatically reacts to sudden total losses of links or nodes.

According to a second option (cf. FIG. 8), the loop recalculation could also be achieved without using a link state protocol, e.g. without using RSTP.

In this case, the master node would still read out the instantaneous link capacities and run the algorithm for the calculation of the optimal link to be broken. The master node would then take this link out of use by remote management actions via the management interface, as e.g. disabling/blocking the corresponding interfaces in the two transit nodes connected to the optimal link (cf. step S210B of FIG. 8). In the example of FIG. 4C, the right-hand side port interface of node X5 and the left-hand side port interface of node X4 would be disabled/blocked accordingly. After loop reconfiguration, the process returns to the beginning of the overall process, i.e. to step S000 of FIG. 2

It is to be noted that the underlying measure for path cost based loop reconfiguration is the path cost on respective links. Further, specifics about path cost setting at the nodes are not essential for the present invention and its embodiments.

As already mentioned above, the link capacities are assumed to change over time. That means that also the optimal location of the break might change from a previous optimal break link to a new optimal break link. Then the loop will have to be reconfigured such that the loop is broken at the new optimal link and is re-closed at the previous optimal link. This may be achieved by embodiments of the present invention, which are basically comparable to the two options for loop reconfiguration as described above.

Besides the above described case where a new optimal link is determined to be broken, embodiments of the present invention also cover cases, wherein the dynamic link determination determines a new determined link replacing a previous determined link previously being broken, and wherein the reconfiguration reconfigures the loop so that the loop is broken at the new determined link and is re-closed at the previous determined link. Such a case is exemplarily illustrated by FIGS. 9A to 9C.

Figure 9A:
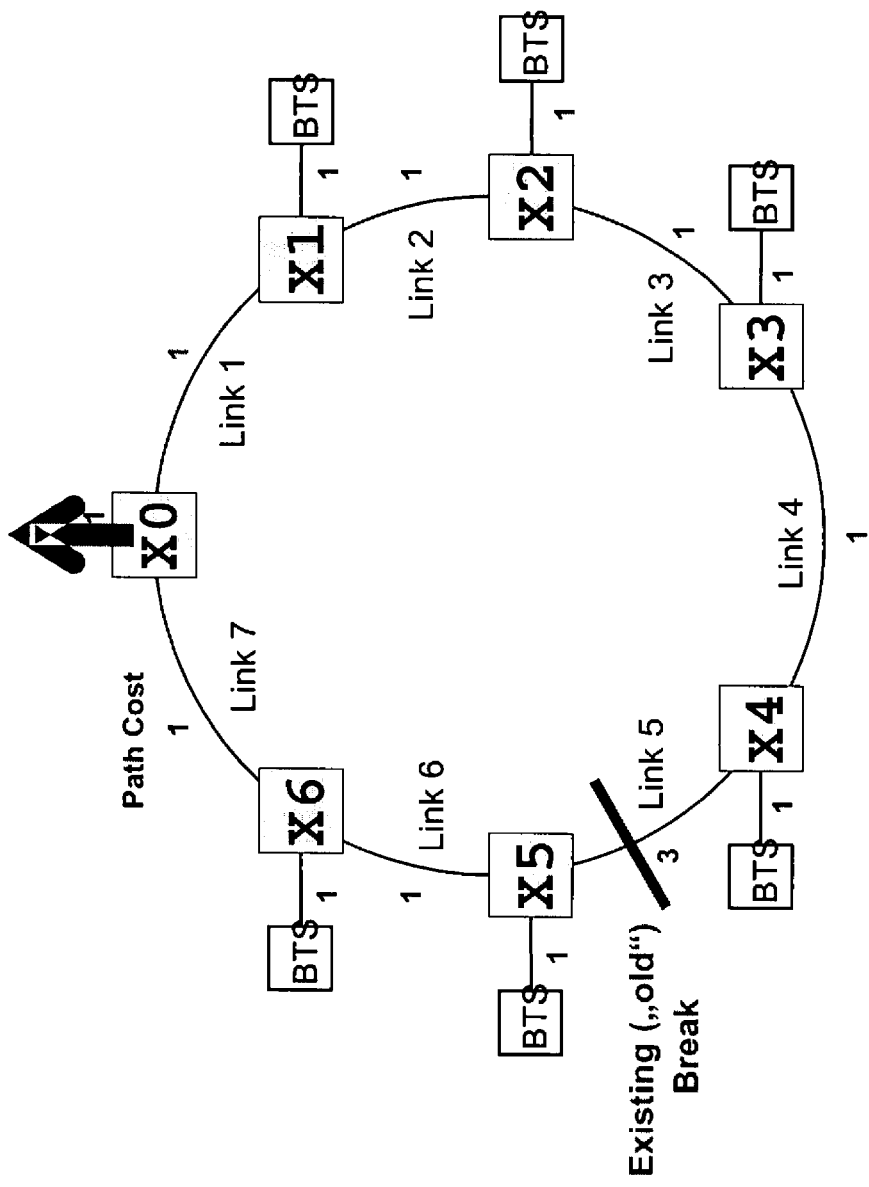
FIGS. 9A to 9C show schematic diagrams of a loop structure and procedures therein, where embodiments of the present invention are applicable.
Figure 9B:
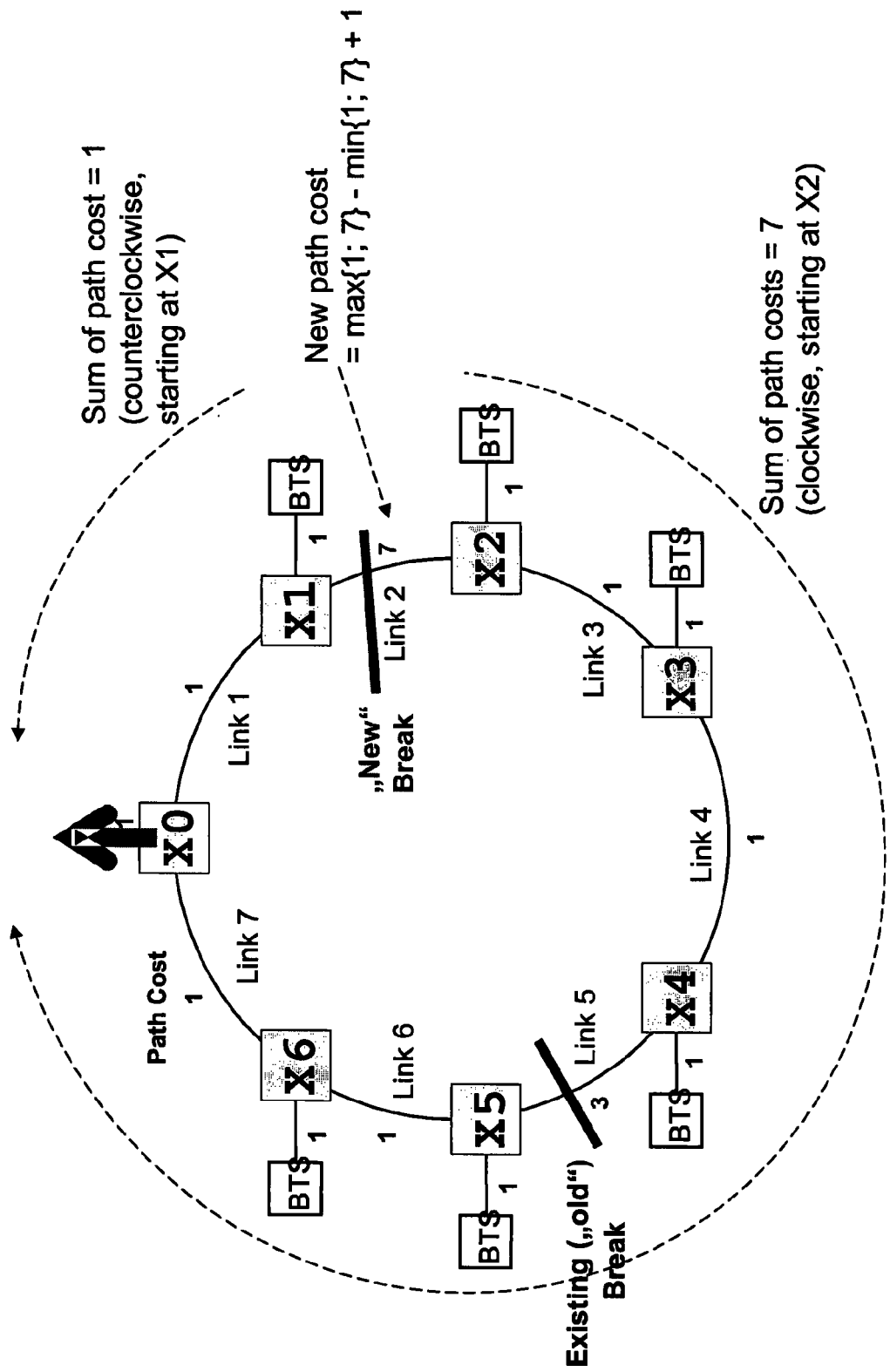
Figure 9C:
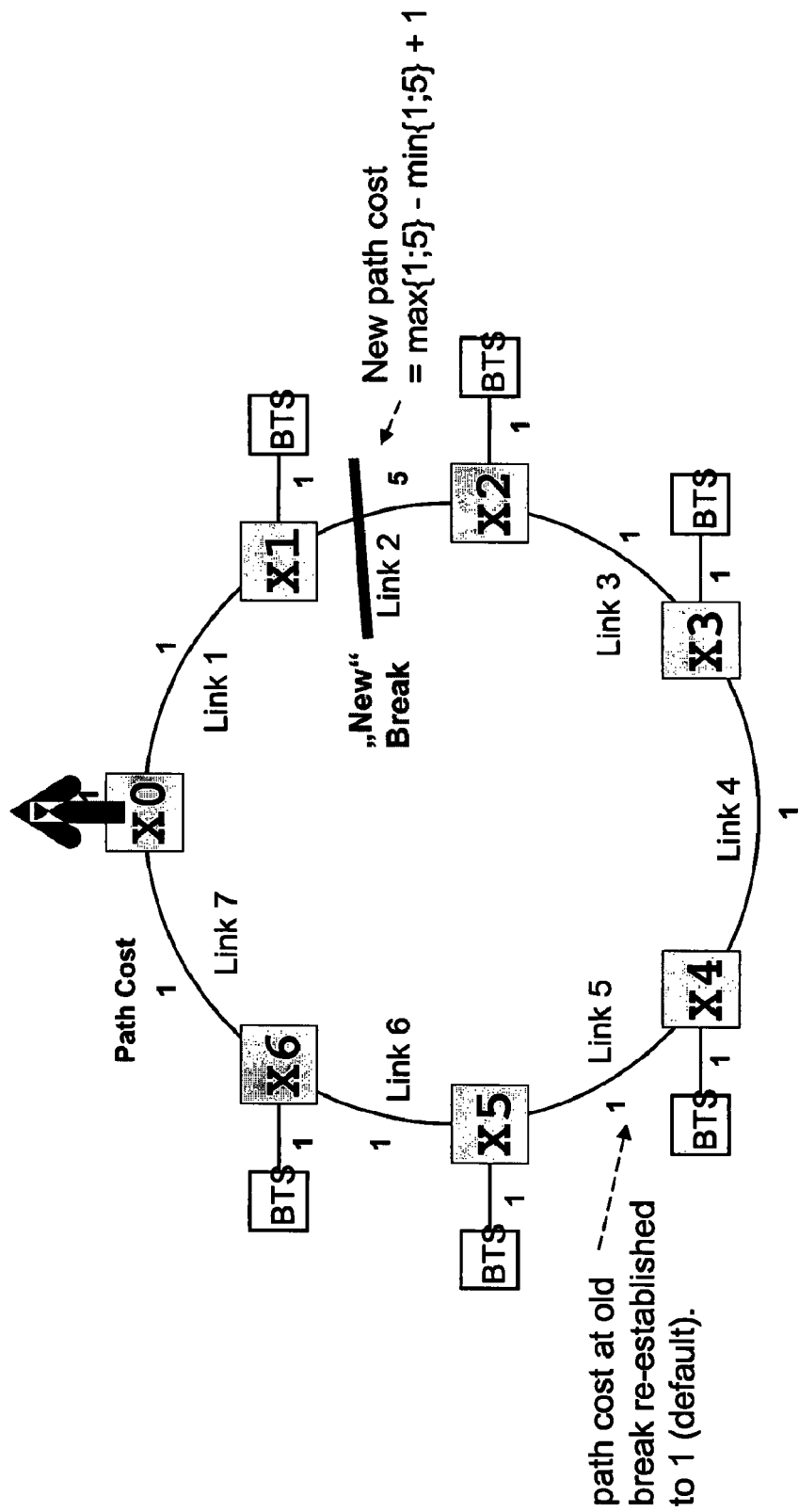

FIGS. 9A to 9C show schematic diagrams of a loop structure and procedures therein, where embodiments of the present invention are applicable.

The basic loop structure underlying the example of FIG. 9 is similar to that of FIG. 4. In the depicted example situation, link 5 has been broken (see FIG. 9A). Pursuant to some changes in link capacities and/or load measures as described above, there could arise the requirement for a new determination of an optimal link. In FIG. 9B it is assumed that the new determined link is link 2.

Accordingly, link 2 has to be broken, and previously broken link 5 has to be re-closed so that the loop has again one break point. In FIG. 9C there is depicted a situation after such a loop reconfiguration in that link is closed again and link 2 is the newly broken link. Details on the procedures accomplished in such a loop reconfiguration process in accordance with FIGS. 9A to 9C will be described with reference to FIGS. 10 and 11.

Figure 10:
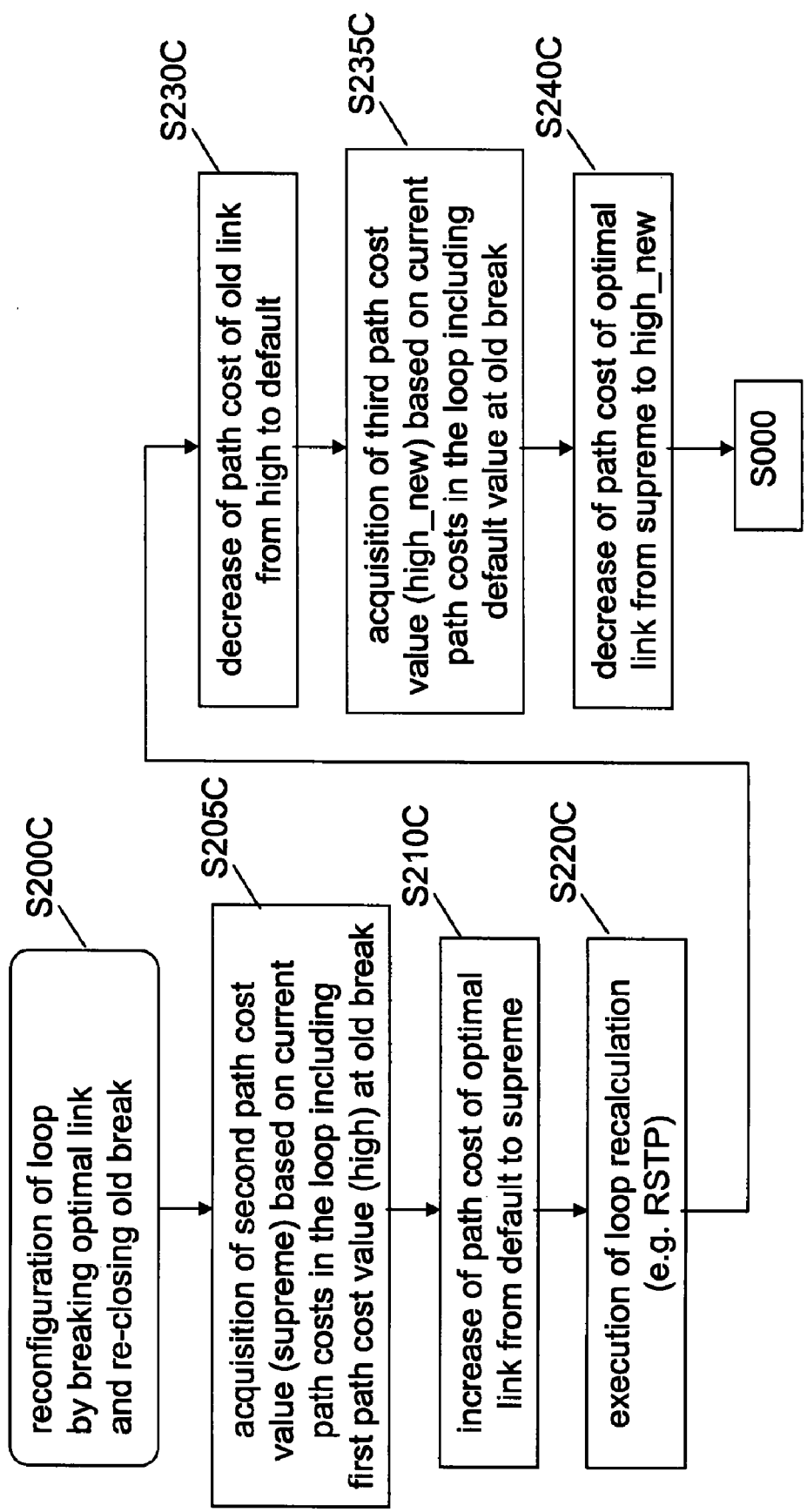
FIGS. 10 and 11 show flowcharts of a third and a fourth example of a method of loop reconfiguration according to an embodiment of the present invention, respectively.
Figure 11:
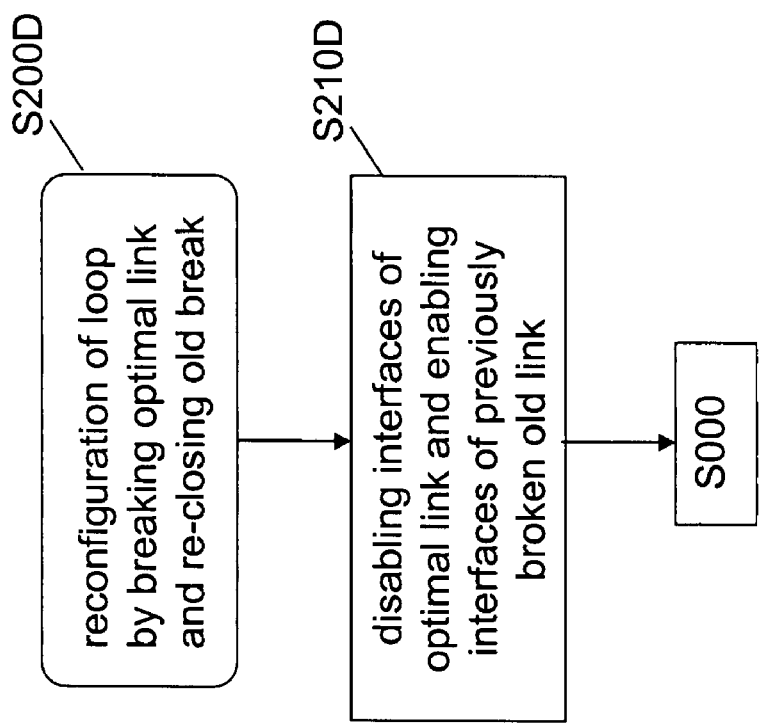

FIGS. 10 and 11 show flowcharts of a third and a fourth example of a method of loop reconfiguration according to an embodiment of the present invention, respectively.

Following the above first option using a link state protocol such as for example the (Rapid) Spanning Tree Protocol (RSTP/STP) or the Open Shortest Path First Protocol (OSPF), the loop reconfiguration may be effected as follows (cf. FIG. 10).

In a first operation of step S205C of FIG. 10, the master node acquires a second path cost value based on current values of path cost parameters of the links of the loop. As the loop has already been broken beforehand at the previous optimal link, in accordance with the process of FIG. 7, a first path cost value has been assigned for that link, e.g. 3. Also taking into consideration this first path cost value (high), the thus acquired second path cost value, also referred to hereinafter as 'supreme, e.g. 7, is set such that it is assured that a link having this second path cost value will be broken in the ongoing loop reconfiguration process even when a broken link with a first path cost value is present. The individual values of path cost parameters of the loop may be obtained through the management interface as e.g. shown in FIGS. 3, 12 and 13, by way of any kind of management protocol.

In a second operation of step S210C of FIG. 10, when a new optimal break point (link) has been found, the master node sends a command to the related transit nodes of the new optimal break point to set the path cost to the acquired second path cost value, i.e. a supreme value, or a higher value. In FIG. 9B this is shown by setting the path cost value of the new link to be broken to the acquired 'supreme' value, i.e. 7.

In a third operation of step S220C of FIG. 10, a loop recalculation e.g. in accordance with RSTP is executed, thus breaking the loop at the new optimal link. That is, the Spanning Tree Algorithm finds out that the optimal spanning tree has been changed and triggers the topology change, i.e. shifts the break to the calculated new optimal position.

In a fourth operation of step S230C of FIG. 10, the previously increased path cost parameter of the previous determined link is decreased from the first path cost value to a default value. That is, the master node sends a command to the transit nodes where the previous break point has been, resetting the link cost e.g. from 3 (high) to 1 (i.e. default). No spanning tree changes will be triggered at this point.

In a fifth operation of step S235C of FIG. 10, the master node acquires a third path cost value, i.e. a new high path cost value, based on current values of path cost parameters of the links of the loop. The third path cost value is smaller than the second path cost value and assures that the new determined link where the loop is broken remains broken when the third path cost value is assigned to it. As the loop has already been re-closed beforehand at the previously broken link and the path cost value thereof has been decreased to a default value (e.g. 1), the default value of this old break is taken into consideration. In the depicted example, the acquired third path cost value is e.g. 5.

In a sixth operation of step S240C of FIG. 10, the path cost parameter of the new determined optimal link is decreased from the second path cost value to the third path cost value, i.e. the new high value. That is, the master node sends a command to the related transit node of the new break point to decrease the link cost e.g. from 7 (supreme) to 5 (high). Again, no spanning tree changes will be triggered.

Thereby, the loop has been stabilized now and is ready for further changes of the break location in a smooth manner without triggering more than necessary link state protocol recalculations. In the loop recalculation based on spanning tree concepts, the node X0 acts as the root node. After loop reconfiguration, the process returns to the beginning of the overall process, i.e. to step S000 of FIG. 2

With respect to the acquisition (i.e. calculation) of the first, second and third path cost values assuring a link break at the optimal link and, where applicable, a re-closing of the loop at a previous optimal link, the following processing may be applied as one non-limiting example.

Starting at a newly calculated break point the path costs from the adjacent nodes to the master node (e.g. X0 in FIGS. 9A to FIG. 9C) are summed up, i.e. in clockwise direction and in counter-clockwise direction. Then the maximum and the minimum values of the two summed values are taken and the new path cost value at the link to be broken is set to the maximum value of the two summed values minus the minimum value of the two summed values plus at least one. Instead of one, any other number larger than zero may also be added. The path cost parameter of the new link is assigned this value.

This general concept is applicable both to path cost setting in the initial breaking scenario of FIG. 4 and the process of FIG. 7, as well as in the re-breaking scenario of FIG. 9 and the process of FIG. 10.

In the scenario of FIG. 9, the following operations will be performed in detail.

a) The link path cost acquiring process starts in the situation of FIG. 9A, where link 5 is broken and its path cost parameter has already been increased to a first path cost value (high) of 3. A supreme value (i.e. second path cost value) is calculated for the new break point as specified above (see FIG. 9B). In this case, the supreme value is max{1;7}−min{1;7}+1=7.

b) Then the supreme value of 7 is assigned to the new link to be broken.

c) Thereupon, a path cost based loop recalculation algorithm such as RSTP is triggered and executed to open the loop at the new break point and to close the loop at the old break point.

d) At the old break point recently being re-closed, the first path cost value, i.e. the old high value, is decreased to a "default" value, e.g. from 3 to 1 (see FIG. 9C).

e) For the new break point, a third path cost value, i.e. a new high value, is calculated as specified above. The third path cost value is smaller than the second path cost value and assures that the new determined link where the loop is broken remains broken when the third path cost value is assigned to it. In this case, the new high value is max{1;5}−min{1;5}+1=5.

f) At the new break point recently being broken, the third path cost parameter is set to the new high value of 5, i.e. decreased from 7 (supreme) to 5 (high_new).

Then the process can start again (if needed), and the new high value (i.e. third path cost value) becomes the old high value (i.e. the first path cost value).

As an alternative, following the above second option without using a link state protocol such as for example the (Rapid) Spanning Tree Protocol (RSTP/STP) or the Open Shortest Path First Protocol (OSPF), the loop reconfiguration may be effected as follows (cf. FIG. 11).

The master node sends commands to the adjacent nodes of the new optimal link to disable/block respective interfaces of towards the new determined link. At the same time or right after that, the master node sends commands to the adjacent nodes of the previous optimal link to enable previously disabled/blocked interfaces of these adjacent nodes towards the previous determined link. This is illustrated in step S210D of FIG. 11, although these two operations may well be considered as two distinct steps. The order of the steps to disable the new optimal link interface and to enable the previously disabled/blocked link interfaces should be considered, in order to not cut the management connection to the nodes between the old and the new loop break points. After loop reconfiguration, the process returns to the beginning of the overall process, i.e. to step S000 of FIG. 2

The sending of commands, as mentioned above, could be implemented by way of the management interface according to FIG. 3, for example.

In the following, two examples of apparatuses according to embodiments of the present invention are described.

FIG. 12 shows a schematic block diagram of a first example of an apparatus according to an embodiment of the present invention. As regards those parts and links of the apparatus already shown in FIG. 3, e.g. the interface modules, reference is made to the description in connection with FIG. 3. The interconnection of the individual blocks is merely illustrative, and is intended to illustrate the interworking of the individual functional blocks.

According to the example embodiment shown in FIG. 12, the loop protection module of the apparatus, which may also be considered as a processor thereof, is configured to perform the loop protection method of step S200 according to FIG. 2. It comprises a link determination module for performing the procedure of step S100 in FIG. 2 or of FIGS. 5 and 6, which may also be referred to as means for dynamically determining a link connecting two adjacent nodes of a loop in accordance with a predefined criterion, i.e. an optimal link. The loop protection module further comprises a reconfiguration module for performing the procedure of step S200 in FIG. 2 or of FIGS. 7 to 10, which may also be referred to as means for reconfiguring the loop so that the loop is broken at the determined (optimal) link.

The link determination module according to the present example embodiment comprises a collector module being configured to collect link capacities of each link of the loop (cf. step S120 of FIG. 5), and a calculator module being configured to calculate a link for breaking the loop using the link capacities collected (cf. step S130 of FIG. 5), which link is optimal with regard to a predefined criterion. The collecting of link capacities is effected by the collector module by use of the management interface and/or the Ethernet transport interface, providing a connection to each node of the loop.

In the depicted example according to FIG. 12, the link determination module further comprises two functionalities which are optional. First, a functionality of checking a requirement of dynamic link determination (cf. step S110 of FIG. 5) is provided by means of a timer module being configured to count a predefined time period, and a checker module, denoted as determination checker, being configured to check the requirement of dynamic link determination based on the predefined time period counted by the timer module. Second, a functionality of checking a requirement of loop reconfiguration (cf. step S140 of FIG. 5) is provided by means of a checker module, denoted as reconfiguration checker, being configured to check the requirement of loop reconfiguration based on the optimal link calculated, e.g. by applying a hysteresis curve.

Further according to the example embodiment shown in FIG. 12, the calculator module comprises a computer module being configured to perform a computation in line with step S131 of FIG. 6, an identifier module being configured to perform an identification in line with step S132 of FIG. 6, and a specifier module being configured to perform a specification in line with step S133 of FIG. 6.

When an optimal link is determined, either for the first time or in a subsequent process replacing a previous optimal link by a new optimal link, the processing is transferred from the link determination module to the reconfiguration module.

The reconfiguration module according to the present example embodiment comprises a path cost value acquisition module being configured to perform an acquiring operation of a path cost value, i.e. a first, second or third path cost value, in line with any one of step S205A of FIG. 7, as well as steps S205C and S235C of FIG. 10, a path cost setting module being configured to perform a path cost setting operation including increasing and decreasing path cost parameters in line with any one of steps S210A of FIG. 7, and steps S210C, 230C and 240C of FIG. 10. The reconfiguration module further comprises a loop recalculation module being configured to execute a loop recalculation, which in the present example including a path cost setting module is in line with any one of steps S220A of FIG. 7 and S220C of FIG. 10. Both path cost setting and loop recalculation are effected by use of the management interface connecting the present apparatus representing master node X0 with any other node in the loop.

FIG. 13 shows a schematic block diagram of a second example of an apparatus according to an embodiment of the present invention. As the basic structure of the apparatus depicted in FIG. 13 is rather similar to that of FIG. 12, only the differences will be described, whereas for the other parts reference is made to the description in connection with FIG. 12.

According to the example embodiment shown in FIG. 13, the functionality of checking a requirement of dynamic link determination (cf. step Silo of FIG. 5) is provided by means of a change indicator module being configured to indicate link quality changes of links of the loop, which may be flagged via the management interface by any one of the nodes of the loop, and a checker module, denoted as determination checker, being configured to check the requirement of dynamic link determination based on the link capacity changes indicated.

In addition to the above apparatus of FIG. 12, the present link determination module further comprises an obtainer module being configured to obtain a load measure for each node of the loop via the management interface. Accordingly, the computer module of the calculator module is configured to compute the minimum of an available capacity for each link in the loop by involving the load measures obtained for the nodes of the loop. Thus, the modified link calculation taking into account actual load situation and/or current load demands of the nodes in the loop is accomplished.

The reconfiguration module according to the present example embodiment comprises an interface setting module being configured to perform operations including interface disabling/blocking and interface enabling/unblocking in line with any one of steps S210B of FIG. 8 and S210D of FIG. 10. Thereby, the loop is reconfigured such that it is broken at the optimal link. The interface setting is affected by use of the management interface connecting the present apparatus representing master node X0 with any other node in the loop.

Although by way of FIGS. 12 and 13 two exemplary embodiments of an apparatus according to the present invention are shown and described, it is to be noted that any combination of individual blocks depicted in the two figures may also be implemented within the framework of embodiments of the present invention. For example, the determination checker modules may be omitted, the reconfiguration checker modules may be omitted, an obtainer module may also be included in the apparatus of FIG. 12, the timer module and the change indicator module may be exchanged or implemented together, thus accomplishing a determination checking based on both parameters thereof, and so on.

An apparatus according to various embodiments of the present invention may for example be a node of the loop in which an optimal break point is to be determined, or it may be integrated into at least one of a stand-alone transmission node, a base station (BTS, NodeB), a base station controller (BSC), and a radio network controller (RNC). Accordingly, it may be a part of a network such as a 2G or 3G mobile network such as a corresponding radio access network. The apparatus may provide an interface to the outside of the loop, via which upstream traffic passes, i.e. the apparatus is located at the one and only node (e.g. node X0) through which all (upstream) traffic of the loop floats.

Any methods and operations described above may of course be implemented by way of software and/or hardware.

In general, it is to be noted that respective functional elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Furthermore, method steps and functions likely to be implemented as software code portions and being run using a processor at one of the entities are software code independent and can be specified using any known or future developed programming language such as e.g. Java, C++, C, and Assembler. Method steps and/or devices or means likely to be implemented as hardware components at one of the entities are hardware independent and can be implemented using any known or future developed hardware technology or any hybrids of these, such as MOS, CMOS, BiCMOS, ECL, TTL, etc, using for example ASIC components or DSP components, as an example. Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to those skilled in the art.

Generally, for the purpose of the present invention as described herein above, it should be noted that a communication device or terminal may for example be any device by means of which a user may access a network and/or a server of such network; this implies mobile as well as non-mobile devices and networks, independent of the technology platform on which they are based; only as an example, it is noted that terminals operated according to principles standardized by the $3^{rd}$ Generation Partnership Project 3GPP and known for example as UMTS terminals (Universal Mobile Telecommunication System) are particularly suitable for being used in connection with the present invention, nevertheless terminals conforming to standards such as GSM (Global System for Mobile communications) or IS-95 (Interim Standard 95) may also be suitable;

networks referred to in this connection may comprise mobile and fixed network sections independent of the type of technology on which the networks are operated, for example those networks operate on the basis of the Internet Protocol IP, independent of the protocol version (IPv4 or IPv6), or on the basis of any other packet protocol such as User Datagram Protocol UDP, etc.

devices can be implemented as individual devices, devices may also be implemented as a module configured to accomplish interoperability with other modules constituting an entire apparatus, e.g. a module device may be represented as a chipset or chip card e.g. insertable and/or connectable to an apparatus such as a mobile phone, or a module may be realized by executable code stored to a mobile phone or other device for execution upon invocation.

Although described above mainly with respect to methods, procedures, an apparatus and modules thereof, it is to be understood that the present invention also covers a computer program for implementing such methods or procedures and/or for operating such an apparatus or modules, as well as a storage medium storing such a computer program. The present invention also covers any conceivable combination of method steps and operations described above, and any conceivable combination of nodes, apparatuses and modules described above. For example, the present invention also covers a communication network, a loop structure of nodes, and a system of arbitrary nodes of such a loop, as long as the above-described concepts of methodology and structural arrangement are applicable.

In view of foregoing, there is presented a loop protection mechanism (with load balancing capability) including dynamically determining a link connecting two adjacent nodes of a loop in a communication network in accordance with a predefined criterion, and reconfiguring the loop so that the loop is broken at the determined link which is an optimal link in terms of the predefined criterion. The breaking of the loop enables for example to utilize loop-free technologies (e.g. Ethernet) in a physical loop architecture. Thus, for example, optimized Ethernet support in an MWR-based network, e.g. radio access network, including at least one loop is enabled. Thus, a hub or switch in a loop may be upgraded with Ethernet switching support.

Even though the invention is described above with reference to the examples according to the accompanying drawings, it is clear that the invention is not restricted thereto. Rather, it is apparent to those skilled in the art that the present invention can be modified in many ways without departing from the scope of the inventive idea as disclosed in the appended claims.

What is claimed is:

1. A method comprising:

dynamically determining, via a processor, a link connecting two adjacent nodes of a loop in a communication network in accordance with a predefined criterion, wherein determining the link comprises collecting link capacities of each link of the loop, and calculating the link for breaking the loop using the link capacities collected, the link being optimal with regard to the predefined criterion, wherein calculating the link comprises:

computing, for each link in the loop, a minimum of an available capacity of a node when the loop is broken at that link, identifying, for the loop, an overall maximum of the minimum available capacities calculated for each link, and specifying, as the optimal link for breaking, the link whose minimum available capacity calculated corresponds to the overall maximum capacity identified; and wherein the method further comprises causing the loop to be reconfigured so that the loop is broken at the determined link.

2. The method according to claim 1, wherein the dynamic link determination comprises checking a requirement of the dynamic link determination based on at least one of a predefined time period and link capacity changes of links of the loop.

3. The method according to claim 1, further comprising obtaining a load measure for each node of the loop, wherein the computation of the minimum of an available capacity for each link in the loop involves the load measures obtained for the nodes of the loop.

4. The method according to claim 1, wherein the dynamic link determination comprises checking a requirement of loop configuration based on the link calculated by applying a hysteresis.

5. The method according to claim 1, wherein the reconfiguration comprises acquiring a first path cost value based on current values of path cost parameters of the links of the loop, wherein the first path cost value is a value assuring that the determined link having the first path cost value is broken during loop reconfiguration, increasing a path cost parameter of the determined link to the first path cost value, and executing a loop recalculation in accordance with a predefined link state protocol, thus breaking the loop at the determined link.

6. The method according to claim 5, wherein the predefined link state protocol comprises at least one of a spanning tree protocol and an open shortest path first protocol.

7. The method according to claim 1, wherein causing the loop to be reconfigured comprises disabling respective interfaces of the two adjacent nodes towards the determined link, thus breaking the loop at the determined link.

8. The method according to claim 1, wherein dynamically determining the link comprises determining a new determined link that replaces a previous determined link that was previously being broken, and wherein causing the loop to be reconfigured comprises causing the loop to be reconfigured so that the loop is broken at the new determined link and is re-closed at the previous determined link.

9. The method according to claim 8, wherein causing the loop to be reconfigured comprises:
  acquiring a second path cost value based on current values of path cost parameters of the links of the loop, including a first path cost value to which a path cost parameter of the previous determined link is increased, wherein the second path cost value is a value assuring that the new determined link having the second path cost value is broken during loop reconfiguration,
  increasing a path cost parameter of the new determined link to the second path cost value,
  executing a loop recalculation in accordance with a predefined link state protocol, thus breaking the loop at the new determined link and re-closing the loop at the previous determined link,
  decreasing the previously increased path cost parameter of the previous determined link from the first path cost value to a default value,
  acquiring a third path cost value based on current values of path cost parameters of the links of the loop, including the default value to which the path cost parameter of the previous determined link is decreased, and
  decreasing the path cost parameter of the new determined link from the second path cost value to the third path cost value.

10. The method according to claim 9, wherein the predefined link state protocol comprises at least one of a spanning tree protocol and an open shortest path first protocol.

11. The method according to claim 8, wherein causing the loop to be reconfigured comprises causing respective interfaces of the two adjacent nodes towards the new determined link to be disabled and causing previously disabled interfaces of adjacent nodes towards the previous determined link to be enabled, thus breaking the loop at the determined link and re-closing the loop at the previous determined link.

12. The method according to claim 1, wherein the loop comprises an Ethernet transport technology.

13. The method according to claim 1, wherein the communication network comprises a radio access network.

14. The method according to claim 1, wherein the communication network comprises at least one microwave radio link.

15. An apparatus comprising at least one processor and at least one memory including computer program code, the at least one memory and the computer program code configured to, with the at least one processor, direct the apparatus at least to:
  dynamically determine a link connecting two adjacent nodes of a loop in a communication network in accordance with a predefined criterion,
  wherein being directed to determine the link includes being directed to collect link capacities of each link of the loop, and calculate the link for breaking the loop using the link capacities collected, the link being optimal with regard to the predefined criterion,
  wherein being directed to calculate the link includes being directed to:
    compute, for each link in the loop, a minimum of an available capacity of a node when the loop is broken at that link,
    identify, for the loop, an overall maximum of the minimum available capacities calculated for each link, and
    specify, as the optimal link for breaking, the link whose minimum available capacity calculated corresponds to the overall maximum capacity identified; and
  wherein the apparatus is further directed to cause the loop to be reconfigured so that the loop is broken at the determined link.

16. The apparatus according to claim 15, wherein the apparatus directed to determine the link includes being directed to:
  determine a predefined time period,
  indicate link capacity changes of links of the loop, and
  check a requirement of dynamic link determination based on at least one of the predefined time period and the link capacity changes.

17. The apparatus according to claim 15, wherein the apparatus directed to determine the link includes being directed to:
  obtain a load measure for each node of the loop, and
  compute the minimum of an available capacity for each link in the loop by involving the load measures obtained for the nodes of the loop.

18. The apparatus according to claim 15, wherein the apparatus directed to determine the link includes being directed to check a requirement of loop configuration based on the link calculated by applying a hysteresis.

19. The apparatus according to claim 15, wherein the apparatus directed to determine the link includes being directed to:
  acquire a first path cost value based on current values of path cost parameters of the links of the loop, wherein the first path cost value is a value assuring that the determined link having the first path cost value is broken during loop reconfiguration,
  increase a path cost parameter of the determined link to the first path cost value, and
  execute a loop recalculation in accordance with a predefined link state protocol, thus breaking the loop at the determined link.

20. The apparatus according to claim 15, wherein the apparatus directed to determine the link includes being directed to cause respective interfaces of the two adjacent nodes towards the determined link to be disabled, thus breaking the loop at the determined link.

21. The apparatus according to claim 15, wherein the apparatus directed to determine the link includes being directed to determine a new determined link replacing a previous determined link previously being broken, and cause the loop to be reconfigured so that the loop is broken at the new determined link and is re-closed at the previous determined link.

22. The apparatus according to claim 21, wherein the apparatus directed to determine the link includes being directed to:
  acquire a second path cost value based on current values of path cost parameters of the links of the loop, including a first path cost value to which a path cost parameter of the previous determined link is increased, wherein the second path cost value is a value assuring that the new determined link having the second path cost value is broken during loop reconfiguration,
  increase a path cost parameter of the new determined link to the second path cost value,
  execute a loop recalculation in accordance with a predefined link state protocol, thus breaking the loop at the new determined link and re-closing the loop at the previous determined link,
  decrease the previously increased path cost parameter of the previous determined link from the first path cost value to a default value,
  acquire a third path cost value based on current values of path cost parameters of the links of the loop, including a default value to which the path cost parameter of the previous determined link is decreased, and
  decrease the path cost parameter of the new determined link from the second path cost value to the third path cost value.

23. The apparatus according to claim 21, wherein the apparatus directed to determine the link includes being directed to cause respective interfaces of the two adjacent nodes towards the new determined link to be disabled and cause previously disabled interfaces of adjacent nodes towards the previous determined link to be enabled, thus breaking the loop at the determined link and re-closing the loop at the previous determined link.

24. The apparatus according to claim 15, wherein the apparatus comprises an Ethernet interface configured for communication with nodes of the loop via an Ethernet transport technology.

25. The apparatus according to claim 15, wherein the apparatus acts as a master node of the loop.

26. The apparatus according to claim 15, wherein the communication network comprises a radio access network.

27. The apparatus according to claim 15, wherein the apparatus comprises a node of the loop.

28. The apparatus according to claim 15, wherein the apparatus is integrated into at least one of a stand-alone transmission node, a base station, a base station controller, and a radio network controller.

29. The apparatus according to claim 15, wherein the apparatus provides an interface to the outside of the loop, via which all upstream traffic passes.

30. An apparatus comprising:
   means for dynamically determining a link connecting two adjacent nodes of a loop in a communication network in accordance with a predefined criterion, wherein the means for determining the link comprises means for collecting link capacities of each link of the loop, and means for calculating the link for breaking the loop using the link capacities collected, the link being optimal with regard to the predefined criterion,
   wherein the means for calculating the link comprises:
      means for computing, for each link in the loop, a minimum of an available capacity of a node when the loop is broken at that link,
      means for identifying, for the loop, an overall maximum of the minimum available capacities calculated for each link, and
      means for specifying, as the optimal link for breaking, the link whose minimum available capacity calculated corresponds to the overall maximum capacity identified; and
   wherein the apparatus further comprises means for causing the loop to be reconfigured so that the loop is broken at the determined link.

31. A non-transitory computer readable medium having a computer program stored thereon, the computer program being configured to control a processor to:
   dynamically determine a link connecting two adjacent nodes of a loop in a communication network in accordance with a predefined criterion, wherein the computer program configured to control the processor to determine the link includes being configured to control the processor to collect link capacities of each link of the loop, and calculate the link for breaking the loop using the link capacities collected, the link being optimal with regard to the predefined criterion,
   wherein the computer program configured to control the processor to calculate the link includes being configured to control the processor to:
   compute, for each link in the loop, a minimum of an available capacity of a node when the loop is broken at the link,
   identify, for the loop, an overall maximum of the minimum available capacities calculated for each link, and
   specify, as the optimal link for breaking, the link whose minimum available capacity calculated corresponds to the overall maximum capacity identified; and
   wherein the computer program is further configured to control the processor to cause the loop to be configured so that the loop is broken at the determined link.

* * * * *

UNITED STATES PATENT AND TRADEMARK OFFICE
CERTIFICATE OF CORRECTION

| | | |
|---|---|---|
| PATENT NO. | : 7,876,688 B2 | |
| APPLICATION NO. | : 11/730329 | |
| DATED | : January 25, 2011 | |
| INVENTOR(S) | : Hauenstein et al. | |

It is certified that error appears in the above-identified patent and that said Letters Patent is hereby corrected as shown below:

Column 22,
Line 27, "broken at the", should read --broken at that--;
Line 35, "configured", should read --reconfigured--.

Signed and Sealed this
Twenty-fifth Day of September, 2012

David J. Kappos
*Director of the United States Patent and Trademark Office*